(12) United States Patent
Bhattad et al.

(10) Patent No.: US 12,143,970 B2
(45) Date of Patent: Nov. 12, 2024

(54) CONFIGURED GRANT RESOURCE CONFIGURATION FOR NEW RADIO-UNLICENSED

(71) Applicant: QUALCOMM Incorporated, San Diego, CA (US)

(72) Inventors: Kapil Bhattad, Bangalore (IN); Jing Sun, San Diego, CA (US); Xiaoxia Zhang, San Diego, CA (US); Ananta Narayanan Thyagarajan, Bangalore (IN)

( * ) Notice: Subject to any disclaimer, the term of this patent is extended or adjusted under 35 U.S.C. 154(b) by 0 days.

(21) Appl. No.: 16/815,849

(22) Filed: Mar. 11, 2020

(65) Prior Publication Data

US 2020/0314842 A1 Oct. 1, 2020

(30) Foreign Application Priority Data

Mar. 29, 2019 (IN) .............................. 201941012484
Apr. 11, 2019 (IN) .............................. 201941014677

(51) Int. Cl.
*H04W 72/0446* (2023.01)
*H04W 16/14* (2009.01)
*H04W 74/0808* (2024.01)

(52) U.S. Cl.
CPC ....... *H04W 72/0446* (2013.01); *H04W 16/14* (2013.01); *H04W 74/0808* (2013.01)

(58) Field of Classification Search
CPC ............. H04W 72/0446; H04W 16/14; H04W 74/0808
See application file for complete search history.

(56) References Cited

U.S. PATENT DOCUMENTS

2018/0279327 A1\* 9/2018 Ying ................. H04W 72/0446
2019/0075589 A1 3/2019 Jeon et al.
(Continued)

FOREIGN PATENT DOCUMENTS

TW 201824792 A 7/2018
WO WO-2018232321 A2 12/2018

OTHER PUBLICATIONS

Huawei, et al., "Transmission with Configured Grant in NR Unlicensed Band", 3GPP Draft, 3GPP TSG RAN WG1 Ad-Hoc Meeting 1901, R1-1900063, 3rd Generation Partnership Project (3GPP), Mobile Competence Centre, 650, Route Des Lucioles, F-06921 Sophia-Antipolis Cedex, France, vol. RAN WG1, No. Taipei, Jan. 21, 2019-Jan. 25, 2019, Jan. 11, 2019 (Jan. 11, 2019), XP051575689, 13 Pages, Retrieved from the Internet: URL: http://www.3gpp.org/ftp/tsg%5Fran/WG1%5FRL1/TSGR1%5FAH/NR%5FAH%5F1901/Docs/R1%2D1900063%2Ezip, [retrieved on Jan. 11, 2019], Section 1, Section 2.1, Section 2.4.2.1.

(Continued)

*Primary Examiner* — Siren Wei

(57) ABSTRACT

Configurations for configured grant (CG) in new radio unlicensed (NR-U) systems is disclosed. CG configurations may, based on a periodicity, be provided either using a bitmap, shorter periodicity, or resource indicator value (RIV) signaling of start/end symbols, longer periodicity. Such CG configurations configure M sets of time division resource allocations. CG configuration may include common start/end symbols from for all contiguous allocations in one configuration. Common LBT starting points may be defined for all configured slots as indicated through a bitmap. The CG configuration allows for mini- and full slot configurations, in which the mini-slots are configured within the already configured CG slots. Repetition configurations include a type 1 for coverage and a type 2 for faster retransmission and reduced downlink feedback information (Continued)

(DFI) overhead. With multiple UEs, a UE identifier is added to the uplink control information (UCI). UEs may further ramp up power in the absence of DFI.

26 Claims, 14 Drawing Sheets

(56) References Cited

U.S. PATENT DOCUMENTS

| | | | |
|---|---|---|---|
| 2019/0089489 A1 | 3/2019 | Li et al. | |
| 2019/0230689 A1* | 7/2019 | Cao | H04L 27/2602 |
| 2019/0268935 A1* | 8/2019 | Talarico | H04L 1/1822 |
| 2019/0268935 A1* | 8/2019 | Talarico | H04L 1/1822 |
| 2020/0037354 A1* | 1/2020 | Li | H04W 74/0808 |
| 2020/0037354 A1* | 1/2020 | Li | H04W 74/0808 |
| 2020/0076657 A1* | 3/2020 | Joseph | H04L 1/0025 |
| 2020/0076657 A1* | 3/2020 | Joseph | H04L 1/0032 |
| 2023/0345433 A1 | 10/2023 | Bhattad | |

OTHER PUBLICATIONS

Huawei, et al., "Transmission with Configured Grant in NR Unlicensed Band", 3GPP Draft, 3GPP TSG RAN WG1 Meeting #95, R1-1812197, 3rd Generation Partnership Project (3GPP), Mobile Competence Centre, 650, Route Des Lucioles, F-06921 Sophia-Antipolis Cedex, France, vol. RAN WG1, No. Spokane, USA, Nov. 12, 2018-Nov. 16, 2018, Nov. 11, 2018 (Nov. 11, 2018), XP051554069, 10 Pages, Retrieved from the Internet: URL: http://www.3gpp.org/ftp/Meetings%5F3GPP%5FSYNC/RAN1/Docs/R1%2D1812197%2Ezip, [retrieved on Nov. 11, 2018], Section 1, Section 2.1, Section 2.1,2.2.1, figure 1.

Huawei, et al., "Transmission with Configured Grant in NR Unlicensed Band", 3GPP Draft, 3GPP TSG RAN WG1 Meeting #96, R1-1901528, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 15, 2019 (Feb. 15, 2019), XP051599225, 15 Pages, Retrieved from the Internet: URL: http://www.3gpp.org/ftp/tsg%5Fran/WG1%5FRL1/TSGR1%5F96/Docs/R1%2D1901528%2Ezip, [retrieved on Feb. 15, 2019], Section 1, Section 2.1.

Partial International Search Report—PCT/US2020/022402—ISAEPO—dated Jun. 8, 2020.

Mediatek Inc: "Discussion on NR-U Configured Grant", 3GPP TSG RAN WG1 Meeting#95, R1-1812359, Spokane, USA, Nov. 12, 2018-Nov. 16, 2018, Nov. 16, 2018, 3 pages.

Taiwan Search Report—TW109108171—TIPO—Sep. 9, 2023.

* cited by examiner

CONFIGURED GRANT RESOURCE CONFIGURATION FOR NEW RADIO-UNLICENSED

CROSS-REFERENCE TO RELATED APPLICATIONS

This application claims the benefit of Indian Provisional Patent Application No. 201941012484, entitled, "CONFIGURED GRANT CONFIGURATION FOR NR-U," filed on Mar. 29, 2019, and Indian Provisional Patent Application No. 201941014677, entitled, "CONFIGURED GRANT RESOURCE CONFIGURATION FOR NR-U," filed on Apr. 11, 2019, each of which are expressly incorporated by reference herein in their entirety.

BACKGROUND

Field

Aspects of the present disclosure relate generally to wireless communication systems, and more particularly, to configured grant configuration for new radio (NR) unlicensed (NR-U) operations.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3$^{rd}$ Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipment (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes receiving, by a user equipment (UE), a configured grant (CG) configuration including a periodicity of CG resources available for autonomous uplink (AUL) transmissions and a resource identifier defining a plurality of sets of CG resources, identifying, by the UE, uplink data for the AUL transmissions, performing, by the UE, a listen before talk (LBT) procedure at a start symbol of a first set of CG resources of the plurality of sets of CG resources, and transmitting, by the UE, the uplink data using the first set of CG resources in response to success of the LBT procedure.

In an additional aspect of the disclosure, a method of wireless communication includes receiving, by a UE, a CG configuration defining a plurality of sets of CG resources, receiving, by the UE, a repetition configuration for repeated transmissions of one of more CG hybrid automatic repeat request (HARQ) processes, wherein the repetition configuration includes a first repetition factor defining a first number of back-to-back repetitions over contiguous slots of a first set of CG resources of the plurality of sets of CG resources, and a second repetition factor defining a second number of repetitions performed after a minimum gap time in slots of the first set of CG resources, and transmitting, by the UE, repetitions of the one or more CG HARQ processes according to the repetition configuration over the first set of CG resources.

In an additional aspect of the disclosure, a method of wireless communication includes receiving, by a UE, a CG configuration including a periodicity of CG resources available for AUL transmissions and a resource identifier defining a plurality of sets of CG resources, identifying, by the UE, uplink data for the AUL transmissions, performing, by the UE, a LBT procedure at a start symbol of a first set of CG resources of the plurality of sets of CG resources, transmitting, by the UE, the uplink data using the first set of CG resources in response to success of the LBT procedure, and ramping up, by the UE, a transmission power for transmission of next AUL transmissions in response to a failure of the UE to detect a downlink feedback information (DFI) indicating successful decoding of the AUL transmissions from a serving base station.

In an additional aspect of the disclosure, an apparatus configured for wireless communication includes means for receiving, by a UE, a CG configuration including a periodicity of CG resources available for AUL transmissions and a resource identifier defining a plurality of sets of CG resources, means for identifying, by the UE, uplink data for the AUL transmissions, means for performing, by the UE, a LBT procedure at a start symbol of a first set of CG resources of the plurality of sets of CG resources, and means for transmitting, by the UE, the uplink data using the first set of CG resources in response to success of the LBT procedure.

In an additional aspect of the disclosure, an apparatus configured for wireless communication includes means for receiving, by a UE, a CG configuration defining a plurality of sets of CG resources, means for receiving, by the UE, a repetition configuration for repeated transmissions of one of more CG HARQ processes, wherein the repetition configuration includes a first repetition factor defining a first number of back-to-back repetitions over contiguous slots of a first set of CG resources of the plurality of sets of CG resources, and a second repetition factor defining a second number of repetitions performed after a minimum gap time in slots of the first set of CG resources, and means for transmitting, by the UE, repetitions of the one or more CG HARQ processes according to the repetition configuration over the first set of CG resources.

In an additional aspect of the disclosure, an apparatus configured for wireless communication includes means for receiving, by a UE, a CG configuration including a periodicity of CG resources available for AUL transmissions and a resource identifier defining a plurality of sets of CG resources, means for identifying, by the UE, uplink data for the AUL transmissions, means for performing, by the UE, a LBT procedure at a start symbol of a first set of CG resources of the plurality of sets of CG resources, means for transmitting, by the UE, the uplink data using the first set of CG resources in response to success of the LBT procedure, and means for ramping up, by the UE, a transmission power for transmission of next AUL transmissions in response to a failure of the UE to detect a DFI indicating successful decoding of the AUL transmissions from a serving base station.

In an additional aspect of the disclosure, a non-transitory computer-readable medium having program code recorded thereon. The program code further includes code to receive, by a UE, a CG configuration including a periodicity of CG resources available for AUL transmissions and a resource identifier defining a plurality of sets of CG resources, code to identify, by the UE, uplink data for the AUL transmissions, code to perform, by the UE, a LBT procedure at a start symbol of a first set of CG resources of the plurality of sets of CG resources, and code to transmit, by the UE, the uplink data using the first set of CG resources in response to success of the LBT procedure.

In an additional aspect of the disclosure, a non-transitory computer-readable medium having program code recorded thereon. The program code further includes code to receive, by a UE, a CU configuration defining a plurality of sets of CG resources, code to receive, by the UE, a repetition configuration for repeated transmissions of one of more CG HARQ processes, wherein the repetition configuration includes a first repetition factor defining a first number of back-to-back repetitions over contiguous slots of a first set of CG resources of the plurality of sets of CG resources, and a second repetition factor defining a second number of repetitions performed after a minimum gap time in slots of the first set of CG resources, and code to transmit, by the UE, repetitions of the one or more CG HARQ processes according to the repetition configuration over the first set of CG resources.

In an additional aspect of the disclosure, a non-transitory computer-readable medium having program code recorded thereon. The program code further includes code to receive, by a UE, a CG configuration including a periodicity of CU resources available for AUL transmissions and a resource identifier defining a plurality of sets of CG resources, code to identify, by the UE, uplink data for the AUL transmissions, code to perform, by the UE, a LBT procedure at a start symbol of a first set of CG resources of the plurality of sets of CG resources, code to transmit, by the UE, the uplink data using the first set of CG resources in response to success of the LBT procedure, and code to ramp up, by the UE, a transmission power for transmission of next AUL transmissions in response to a failure of the UE to detect a DFI indicating successful decoding of the AUL transmissions from a serving base station.

In an additional aspect of the disclosure, an apparatus configured for wireless communication is disclosed. The apparatus includes at least one processor, and a memory coupled to the processor. The processor is configured to receive, by a UE, a CG configuration including a periodicity of CG resources available for AUL transmissions and a resource identifier defining a plurality of sets of CG resources, to identify, by the UE, uplink data for the AUL transmissions, to perform, by the UE, a LBT procedure at a start symbol of a first set of CG resources of the plurality of sets of CG resources, and to transmit, by the UE, the uplink data using the first set of CG resources in response to success of the LBT procedure.

In an additional aspect of the disclosure, an apparatus configured for wireless communication is disclosed. The apparatus includes at least one processor, and a memory coupled to the processor. The processor is configured to receive, by a UE, a CG configuration defining a plurality of sets of CG resources, to receive, by the UE, a repetition configuration for repeated transmissions of one of more CG HARQ processes, wherein the repetition configuration includes a first repetition factor defining a first number of back-to-back repetitions over contiguous slots of a first set of CG resources of the plurality of sets of CG resources, and a second repetition factor defining a second number of repetitions performed after a minimum gap time in slots of the first set of CG resources, and to transmit, by the UE, repetitions of the one or more CG HARQ processes according to the repetition configuration over the first set of CG resources.

In an additional aspect of the disclosure, an apparatus configured for wireless communication is disclosed. The apparatus includes at least one processor, and a memory coupled to the processor. The processor is configured to receive, by a UE, a CG configuration including a periodicity of CG resources available for AUL transmissions and a resource identifier defining a plurality of sets of CG resources, to identify, by the UE, uplink data for the AUL transmissions, to perform, by the UE, a LBT procedure at a start symbol of a first set of CG resources of the plurality of sets of CG resources, to transmit, by the UE, the uplink data using the first set of CG resources in response to success of the LBT procedure, and to ramp up, by the UE, a transmission power for transmission of next AUL transmissions in response to a failure of the UE to detect a DFI indicating successful decoding of the AUL transmissions from a serving base station.

In an additional aspect of the disclosure, a method of wireless communication includes receiving, by a UE, a CG configuration including a periodicity of CG resources available for AUL transmissions and a set of hierarchical resource configurations defining a plurality of sets of CG resources, wherein a first configuration of the set of hierarchical resource configurations define a coarse span of a CG resource and subsequent configurations of the set of hierarchical resource configurations refine the definition of the coarse span to identify the plurality of sets of CG resources, identifying, by the UE, uplink data for the AUL transmissions, performing, by the UE, a LBT procedure at a start symbol of a first set of CG resources of the plurality of sets of CG resources, and transmitting, by the UE, the uplink data using the first set of CG resources in response to success of the LBT procedure.

In an additional aspect of the disclosure, an apparatus configured for wireless communication includes means for receiving, by a UE, a CG configuration including a periodicity of CG resources available for AUL transmissions and a set of hierarchical resource configurations defining a plurality of sets of CG resources, wherein a first configuration of the set of hierarchical resource configurations define a coarse span of a CG resource and subsequent configurations of the set of hierarchical resource configurations refine the definition of the coarse span to identify the plurality of sets of CG resources, means for identifying, by the UE, uplink data for the AUL transmissions, means for performing, by the UE, a LBT procedure at a start symbol of a first set of CG resources of the plurality of sets of CG resources, and means for transmitting, by the UE, the uplink data using the first set of CG resources in response to success of the LBT procedure.

In an additional aspect of the disclosure, a non-transitory computer-readable medium having program code recorded thereon. The program code further includes code to receive, by a UE, a CG configuration including a periodicity of CG resources available for AUL transmissions and a set of hierarchical resource configurations defining a plurality of sets of CG resources, wherein a first configuration of the set of hierarchical resource configurations define a coarse span of a CG resource and subsequent configurations of the set of hierarchical resource configurations refine the definition of the coarse span to identify the plurality of sets of CG resources, code to identify, by the UE, uplink data for the AUL transmissions, code to perform, by the UE, a LBT procedure at a start symbol of a first set of CG resources of the plurality of sets of CG resources, and code to transmit, by the UE, the uplink data using the first set of CG resources in response to success of the LBT procedure.

In an additional aspect of the disclosure, an apparatus configured for wireless communication is disclosed. The apparatus includes at least one processor, and a memory coupled to the processor. The processor is configured to receive, by a UE, a CG configuration including a periodicity of CG resources available for AUL transmissions and a set of hierarchical resource configurations defining a plurality of sets of CG resources, wherein a first configuration of the set of hierarchical resource configurations define a coarse span of a CG resource and subsequent configurations of the set of hierarchical resource configurations refine the definition of the coarse span to identify the plurality of sets of CG resources, to identify, by the UE, uplink data for the AUL transmissions, to perform, by the UE, a LBT procedure at a start symbol of a first set of CG resources of the plurality of sets of CG resources, and to transmit, by the UE, the uplink data using the first set of CG resources in response to success of the LBT procedure.

In an additional aspect of the present disclosure, a method of wireless communication includes receiving, by a UE, a CG configuration defining a plurality of sets of CG resources, receiving, by the UE, a repetition configuration for repeated transmissions of one of more CG HARQ processes, wherein the repetition configuration includes two or more repetition factors, detecting, by the UE, a DFI associated with a CG HARQ process of the one or more CG HARQ processes, wherein the DFI is detected between repetitions according to a first repetition factor of the two or more repetition factors, dropping, by the UE, remaining repetitions of the CG HARQ process remaining according to the first repetition factor when the DFI indicates the CG HARQ process has been successfully decoded, and transmitting, by the UE, repetitions of the one or more CG HARQ processes over the first set of CG resources according to one or more additional repetition factors of the two or more repetition factors.

In an additional aspect of the disclosure, an apparatus configured for wireless communication includes means for receiving, by a UE, a CG configuration defining a plurality of sets of CG resources, means for receiving, by the UE, a repetition configuration for repeated transmissions of one of more CG HARQ processes, wherein the repetition configuration includes two or more repetition factors, means for detecting, by the UE, a DFI associated with a CG HARQ process of the one or more CG HARQ processes, wherein the DFI is detected between repetitions according to a first repetition factor of the two or more repetition factors, means for dropping, by the UE, remaining repetitions of the CG HARQ process remaining according to the first repetition factor when the DFI indicates the CG HARQ process has been successfully decoded, and means for transmitting, by the UE, repetitions of the one or more CG HARQ processes over the first set of CG resources according to one or more additional repetition factors of the two or more repetition factors.

In an additional aspect of the disclosure, a non-transitory computer-readable medium having program code recorded thereon. The program code further includes code to receive, by a UE, a CG configuration defining a plurality of sets of CG resources, code to receive, by the UE, a repetition configuration for repeated transmissions of one of more CG HARQ processes, wherein the repetition configuration includes two or more repetition factors, code to detect, by the UE, a DFI associated with a CG HARQ process of the one or more CG HARQ processes, wherein the DF1 is detected between repetitions according to a first repetition factor of the two or more repetition factors, code to drop, by the UE, remaining repetitions of the CG HARQ process remaining according to the first repetition factor when the DFI indicates the CG HARQ process has been successfully decoded, and code to transmit, by the UE, repetitions of the one or more CG HARQ processes over the first set of CG resources according to one or more additional repetition factors of the two or more repetition factors.

In an additional aspect of the disclosure, an apparatus configured for wireless communication is disclosed. The apparatus includes at least one processor, and a memory coupled to the processor. The processor is configured to receive, by a UE, a CG configuration defining a plurality of sets of CG resources, to receive, by the UE, a repetition configuration for repeated transmissions of one of more CG HARQ processes, wherein the repetition configuration includes two or more repetition factors, to detect, by the UE, a DEI associated with a CG HARQ process of the one or more CG HARQ processes, wherein the DFI is detected between repetitions according to a first repetition factor of the two or more repetition factors, to drop, by the UE, remaining repetitions of the CG HARQ process remaining according to the first repetition factor when the DFI indicates the CG HARQ process has been successfully decoded, and to transmit, by the UE, repetitions of the one or more CG HARQ processes over the first set of CG resources according to one or more additional repetition factors of the two or more repetition factors.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
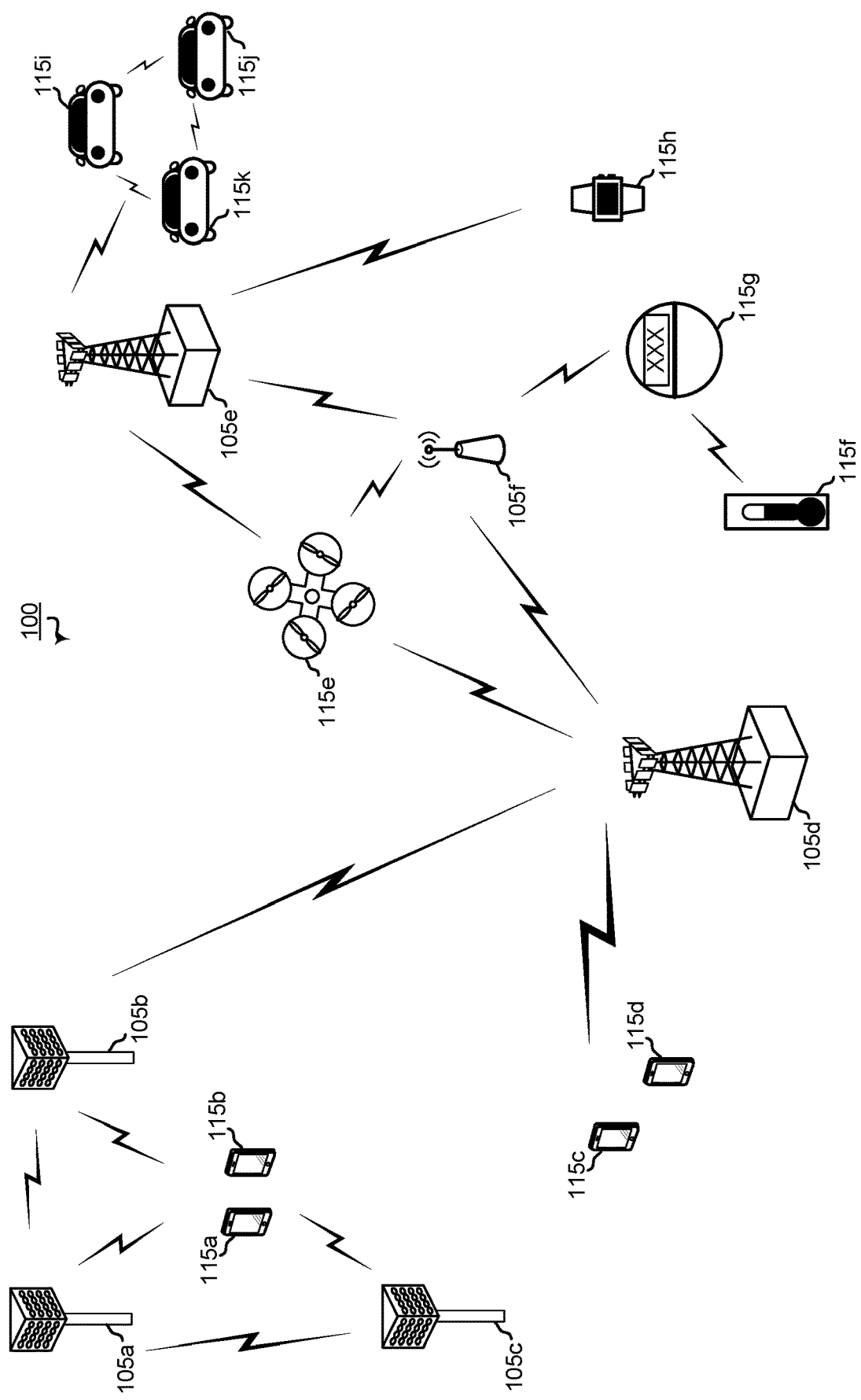
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "$3^{rd}$ Generation Partnership Project" (3GPP), and cdma2000 is described in documents from an organization named "$3^{rd}$ Generation Partnership Project 2" (3GPP2). These various radio technologies and standards are known or are being developed. For example, the $3^{rd}$ Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) or internet of things (IoT) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
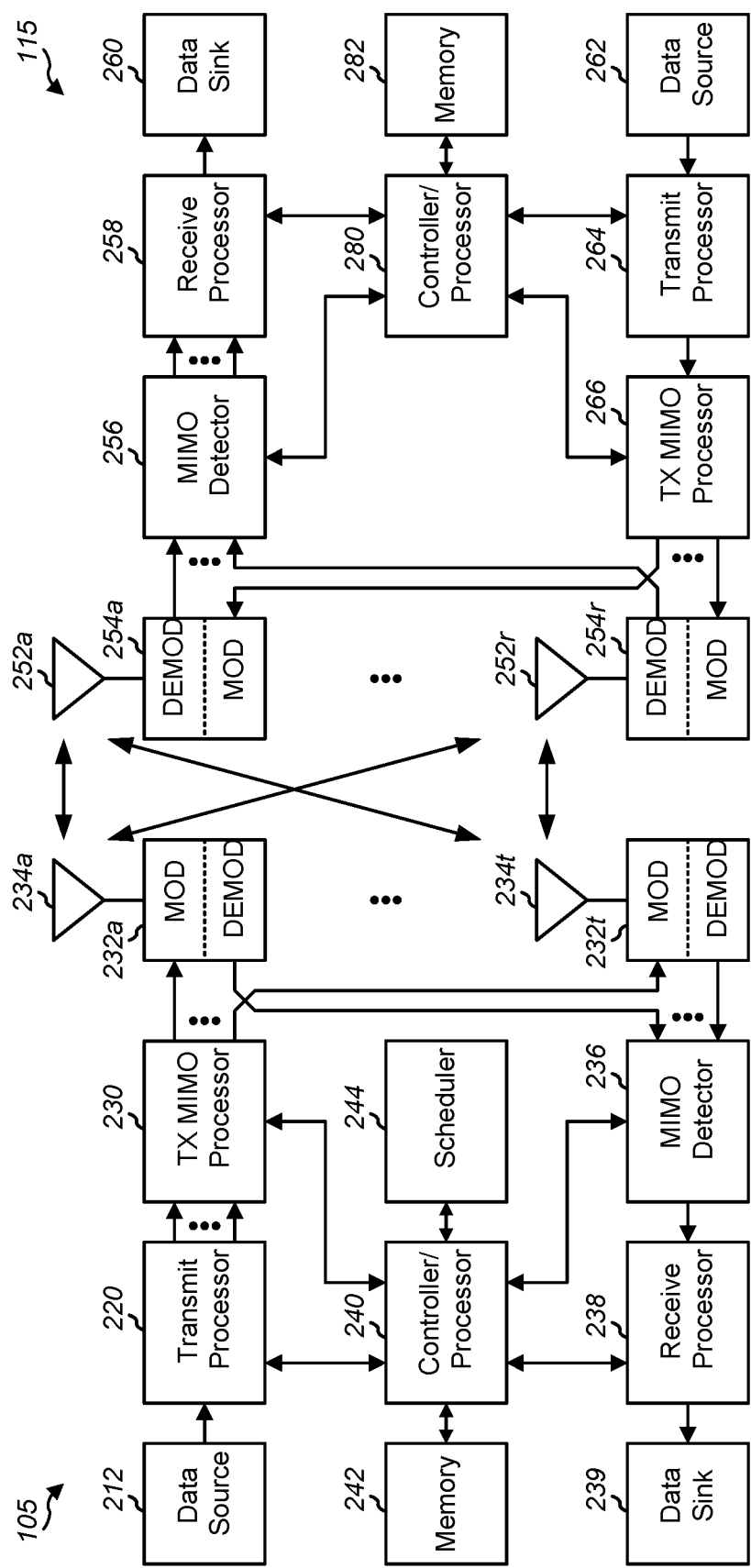
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 4, 10, and 12, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
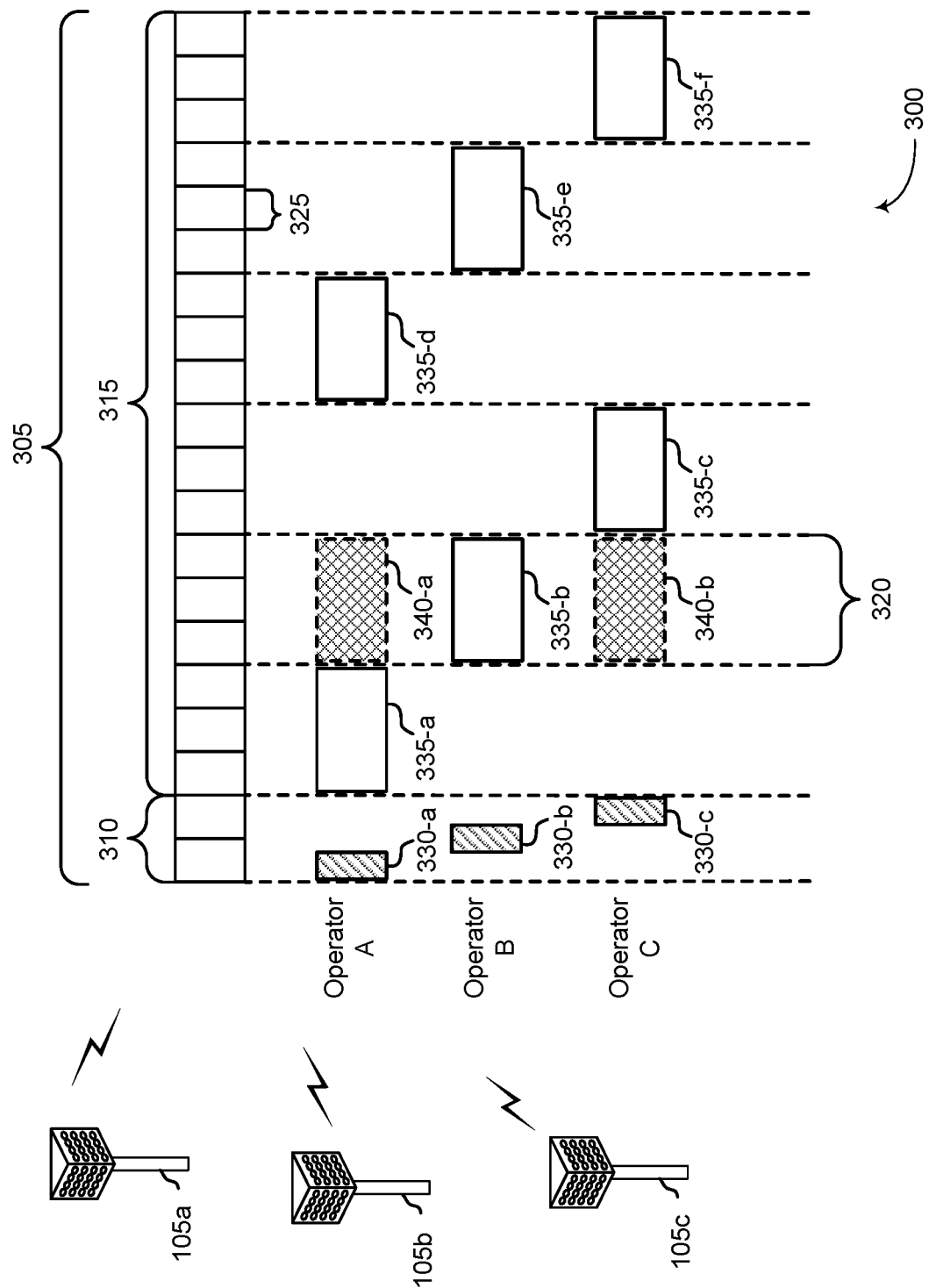
FIG. 3 is a block diagram illustrating a wireless communication system including base stations that use directional wireless beams.

FIG. 3 illustrates an example of a timing diagram 300 for coordinated resource partitioning. The timing diagram 300 includes a superframe 305, which may represent a fixed duration of time (e.g., 20 ms). Superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-a, even if Operator A chooses not to communicate during those resources. That is, access to exclusive resources is limited to the designated network operator. Similar restrictions apply to resources 330-b for Operator B and resources 330-c for Operator C. The wireless nodes of Operator A (e.g, UEs 115 or base stations 105) may communicate any information desired during their exclusive resources 330-a, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-a may be prioritized for use by Operator A and may therefore be referred to as a G-INT for Operator A (e.g., G-INT-OpA). Similarly, resources 335-b may be prioritized for Operator B, resources 335-c may be prioritized for Operator C, resources 335-d may be prioritized for Operator A, resources 335-e may be prioritized for Operator B, and resources 335-f may be prioritized for operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-a and resources 335-b), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-a without interference from the wireless nodes of Operator B or Operator C.

A network operating entity may additionally signal to another operator that it intends to use a particular G-INT. For example, referring to resources 335-a, Operator A may signal to Operator B and Operator C that it intends to use resources 335-a. Such signaling may be referred to as an activity indication. Moreover, since Operator A has priority over resources 335-a, Operator A may be considered as a higher priority operator than both Operator B and Operator C. However, as discussed above, Operator A does not have to send signaling to the other network operating entities to ensure interference-free transmission during resources 335-a because the resources 335-a are assigned with priority to Operator A.

Similarly, a network operating entity may signal to another network operating entity that it intends not to use a particular G-INT. This signaling may also be referred to as an activity indication. For example, referring to resources 335-b, Operator B may signal to Operator A and Operator C that it intends not to use the resources 335-b for communication, even though the resources are assigned with priority to Operator B. With reference to resources 335-b, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-b may be considered an opportunistic interval (O-INT) for Operator A (e.g., O-INT-OpA). For illustrative purposes, resources 340-a may represent the O-INT for Operator A. Also, from the perspective of Operator C, the same sub-interval 320 may represent an O-INT for Operator C with corresponding resources 340-b. Resources 340-a, 335-b, and 340-b all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-b (e.g., G-INT-OpB), then Operator A may use those same resources (e.g., represented by resources 340-a) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-b) in response to an indication that Operator B was not going to use its G-INT, Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-NT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-μs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with a uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-μs transmission opportunity.

Although three operators are illustrated in FIG. 3, it should be understood that fewer or more network operating entities may be configured to operate in a coordinated manner as described above. In some cases, the location of the G-INT, O-INT, or A-INT within superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

NR operations define both autonomous uplink (AUL) transmissions (also referred to as configured grant UL transmissions) and scheduled uplink (SUL) transmissions. In order to conduct SUL transmissions, a UE (e.g., UE 115) first receives an uplink grant from a serving base station (e.g., base station 105) that identifies the specific uplink resources that may be used by the UE for such SUL transmissions. For conducting AUL transmissions, the UE does not receive a specific grant for transmissions. Instead, sets of resources are pre-configured and available for use in AUL transmissions by UEs. The pre-configured resources are referred to as a configured grant (CG). In NR systems, CG resources are provided every given number, N, of slots, without consideration of repetitions. For NR-U operations, a contiguous type allocation of CG resources may provide more opportunities for a UE to transmit in case of LBT failures. More starting points within a configured slot resource are also desirable for the same reason. Various aspects of the present disclosure provide for efficient configuration of such contiguous slots. Thus, allowing more starting points (e.g., with mini-slots etc). Further aspects provide solutions for handling repetition transmission.

Figure 4:
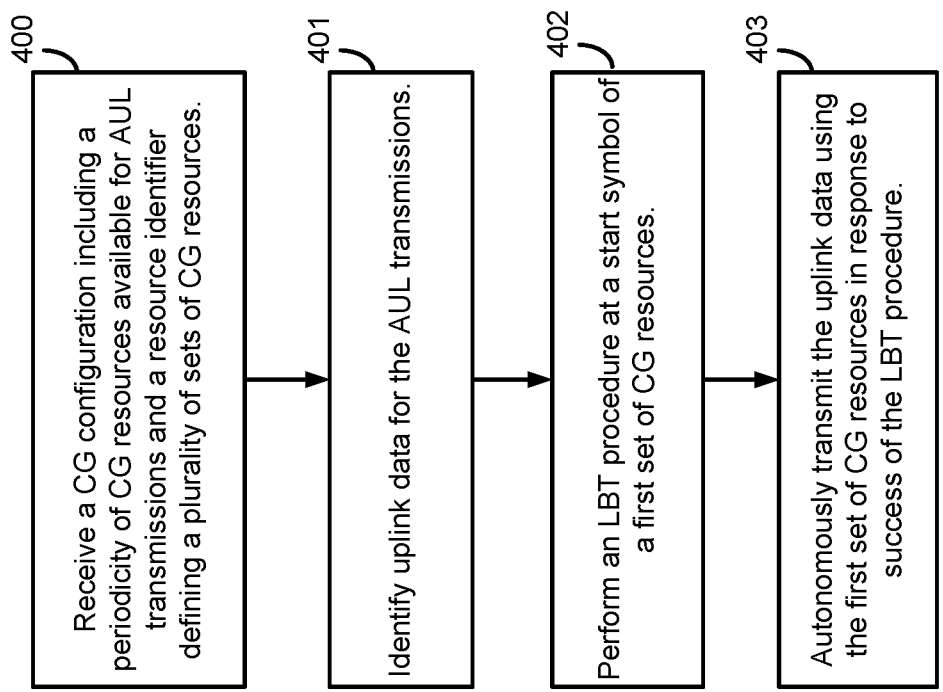
FIG. 4 is a block diagram illustrating example blocks executed to implement one aspect of the present disclosure.
Figure 13:
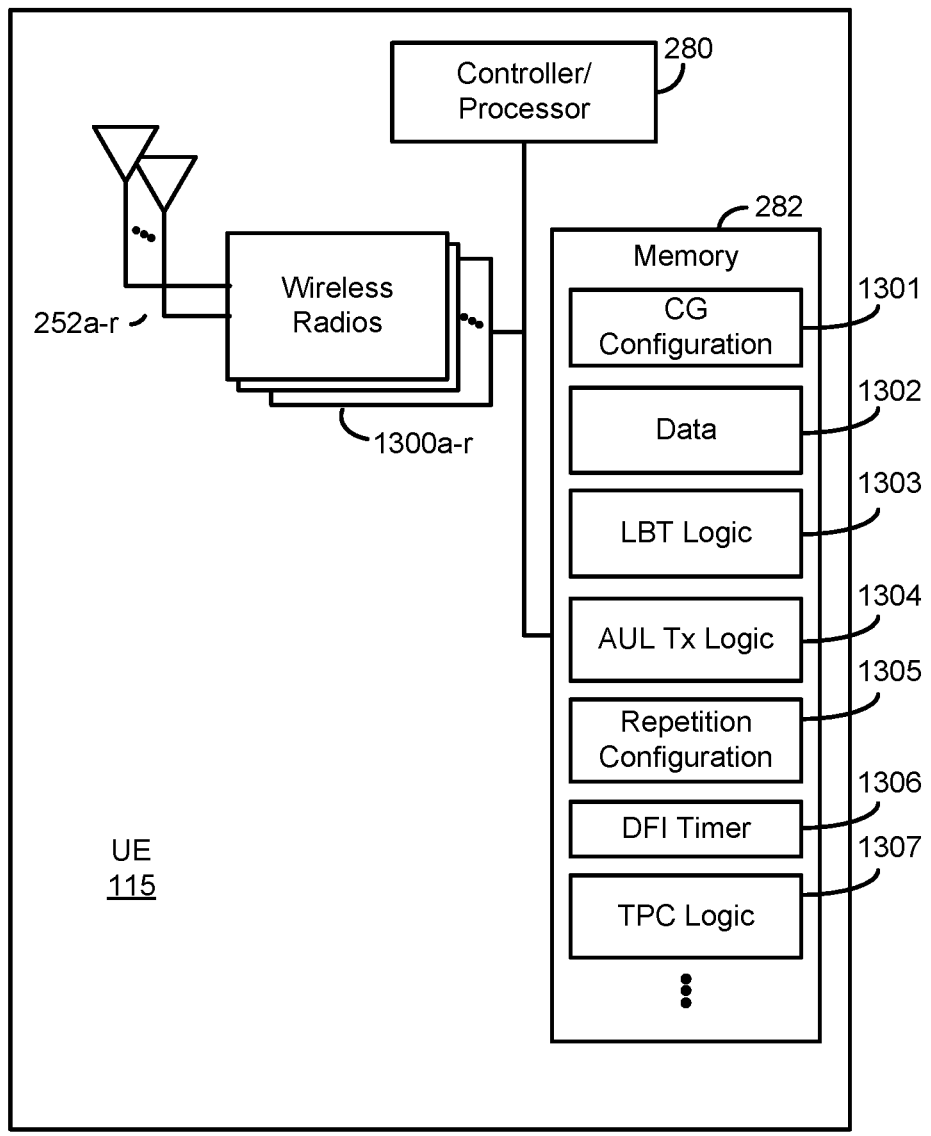
FIG. 13 is a block diagram illustrating a UE configured according to one aspect of the present disclosure.

FIG. 4 is a block diagram illustrating example blocks executed to implement one aspect of the present disclosure. The example blocks will also be described with respect to UE 115 as illustrated in FIG. 13. FIG. 13 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1300a-r and antennas 252a-r. Wireless radios 1300a-r includes various components and hardware, as illustrated in FIG. 2 for UE 115, including modulator/demodulators 254a-r, MIMO detector 256, receive processor 258, transmit processor 264, and TX MIMO processor 266.

At block 400, a UE receives a CG configuration including a periodicity of CG resources available for AUL transmissions and a resource identifier defining a plurality of sets of CG resources. A UE, such as UE 115 receives a CG configuration message from a serving base station, such as base station 105, via antennas 252a-r and wireless radios 1300a-r. Under control of controller/processor 280, UE 115 decodes and stores the configuration information in memory 282 at CG configuration 1301. The CG configuration information includes a periodicity of CG resources along with a resource identifier that identifies one or more sets of contiguous CG resources for CG configuration.

At block 401, the UE identifies uplink data for the AUL transmissions, and, at block 402, performs an LBT procedure at a start symbol of a first set of CG resources of the plurality of sets of CG resources. If UE 115 detects uplink data in memory 282 at data buffer 1302, it may determine, under control of controller/processor 280 to execute AUL transmission logic 1304. The execution environment of AUL transmission logic 1304 provides the functionality of UE 115 to perform AUL transmissions using CG resources defined by the information in CG configuration 1301. In preparation for AUL transmission, UE 115, under control of controller/processor 280, executes LBT logic 1303, stored in memory 282. The execution environment of LBT logic 1303 provides UE 115 with the functionality for performing an LBT procedure (clear channel assessment (CCA), cat-2 LBT, cat-4 LBT, etc.). Within the execution environment of AUL transmission logic 1304, the LBT procedure may be performed at the next available CG starting position in the current CG resource slot.

At block 403, the UE autonomously transmits the uplink data using the first set of CG resources in response to success of the LBT procedure. Upon detection of a successful LBT procedure, UE 115, within the execution environment of AUL transmission logic 1304, prepares an AUL transmission for the CG resources and transmits the data autonomously via wireless radios 1300a-r and antennas 252a-r.

Figure 5:
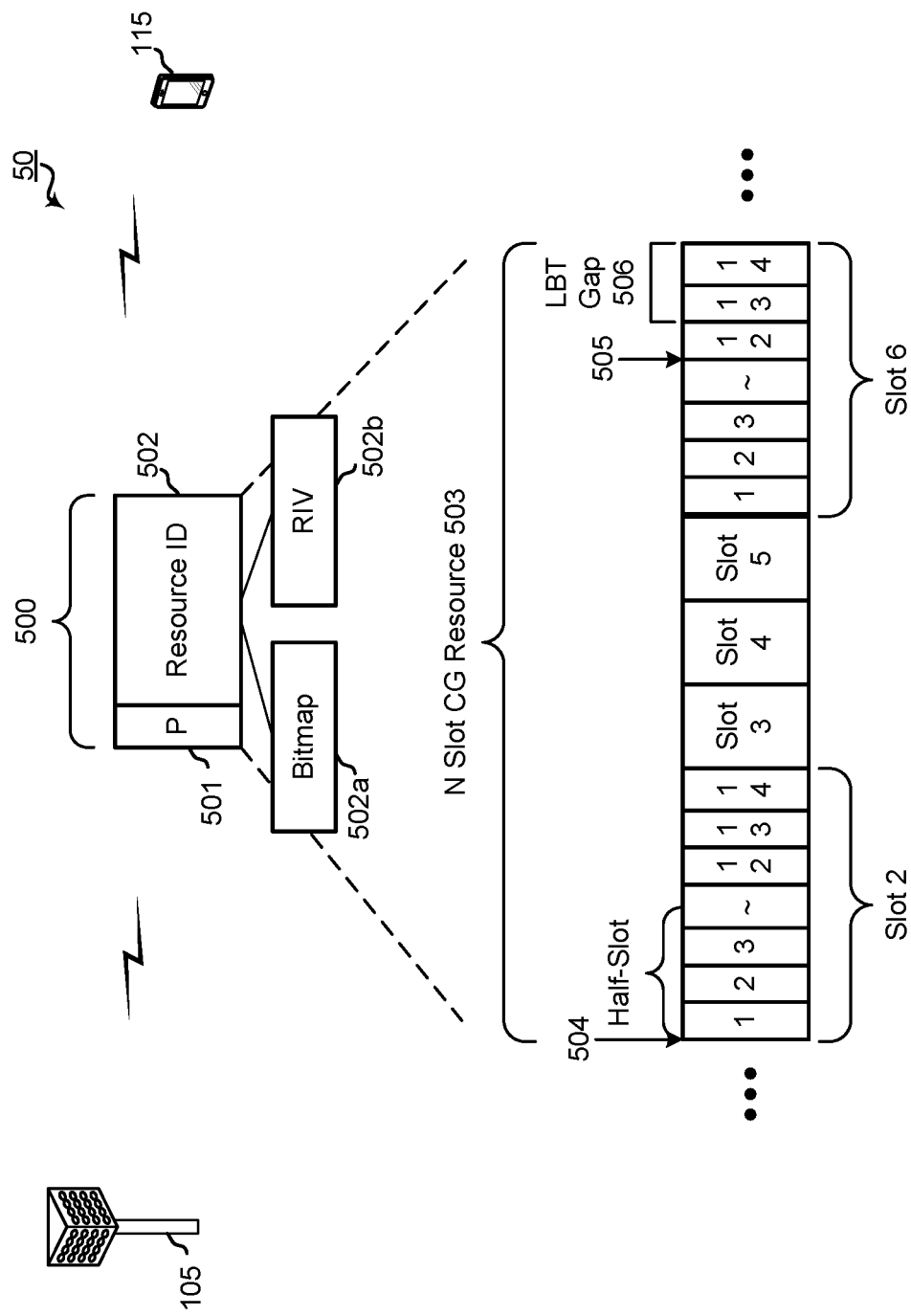
FIG. 5 is a block diagram illustrating a portion of a NR-U network having a base station and UE each configured according to one aspect of the present disclosure.

FIG. 5 is a block diagram illustrating a portion of NR-U network 50 having base station 105 and UE 115 each configured according to one aspect of the present disclosure. Base station 105 and UE 115 are in communication using a shared communication channel. Additionally, UE 115 is capable of performing configured grant transmissions, such as AUL transmissions. Base station 105 may provide CG configuration information by signaling CG configuration message 500 to UE 115. CG configuration message 500 includes at least a periodicity 50, which identifies the period at which CG resources occur on the shared communication channel. CG configuration message 500 further includes resource identifier (ID) 502. According to aspects of the present disclosure, resource ID 502, which identifies the contiguous slots allocated for CG resources 503, may be indicated using a bitmap 502a or by defining a set of resource indicator value (RIV)-type configurations, RIV 502b. The number of RIVs provided in RIV 502b may be included as part of configuration message 500. Resource ID 502 configures multiple sets of CG resources, each set containing a set of contiguous slots, including CG resource 503.

When resource ID 502 includes bitmap 502a of length M, each of the M bits in bitmap 502a may correspond to N slots of CG resources. N may be fixed by agreement in the standards or may be communicated from base station 105 as part of CG configuration message 500. In additional aspects, N may be determined as a function of the subcarrier spacing (SCS). When configured using RIV-type signaling, RIV 502b includes M sets of start/end slot indications in each configuration. The RIV may also additionally provide start/end symbol indication. The start/end symbol indications of RIV 502b identify the starting symbol, symbol 1 (504), of the starting slot, slot 2, and the ending symbol, symbol 12 (505) of the ending slot, slot 6, configured for such CG resource 503. Periodicity 501 of such CU resources may be common across each set resources or configured independently per set.

According to selected aspects of the present disclosure, shorter periodicities may benefit by using bitmaps for identifying CG resources, while longer periodicities may benefit from RIV-type configuration. Thus, the network, via base station 105, may indicate periodicity 501 and use either bitmap 502a for shorter periods (e.g., periodicity 501 less than a threshold period) and RIV 502b configuration for longer periods (e.g., periodicity 501 greater than the threshold period). Such configuration may be determined within each CG configuration. Thus, multiple CG resources may be configured in which different periodicities are configured, that may have corresponding bitmap or RIV-type configurations UE 115, upon identifying the value of periodicity 501, may determine whether resource ID 502 comprises bitmap 502a or RIV 502b by determining how periodicity 501 relates to the predefined threshold period.

Alternatively, UE 115 may switch between bitmap-based and RIV-based CG resource determination based on an indication in CG configuration message 500 (e.g., an explicit bit that triggers switching between bitmap-based and RIV-based determination).

The configuration may also provide addition signaling to provide the starting and ending symbol for both bitmap and RIV based signaling of slot level allocation. For the RIV based approach, this configuration may be jointly coded with the RIV itself. The starting symbol applies to the first slot in a set of contiguously allocated slots while the ending symbol applies to the last slot in the set. All symbols in between these are available for the configured grant transmission. With the indication of starting/ending symbol, the starting symbol identifies starting symbol 1 (504) of the first slot, slot 2, and ending symbol identifies ending symbol 12 (505) of the last slot, slot 6, in a set of contiguously allocated slots, slots 2-6 of CG resource 503. For the RIV based approach, the starting/ending symbol configuration may be provided independently for each of the M sets of starting/ending symbol configurations or may be the same configuration for all sets. For the bitmap based approach, a single starting/ending symbol configuration may apply to each set of contiguously allocated slots.

Because UE 115 may first need to successfully complete a listen before talk (LBT) procedure prior to AUL transmissions, UE 115 may not be able to immediately begin transmissions on first symbol 1 (505) identified by CG configuration message 500. Accordingly, starting symbol 1 (504) may have a granularity that applies to any symbol among the first X symbols of slot 2 (e.g., any of symbols 1-3), where X may either be less than number of OFDM symbols in slot 2, a subset of symbols of slot 2 (e.g., symbols 1, 3, and 12), or full slot (symbols 1-14), in which no indication would be needed in CG configuration message 500. Identification of a subset of symbols may be dependent on the subcarrier spacing (SCS), in which case the relationship between the particular SCS and the associated subset of symbols may be predefined according to the standards or configured as a part of the CG configuration. For example, where slot 2 has a 15 KHz SCS, a half slot granularity may be provided, while a slot level granularity is provided in other SCS configurations (e.g., slots 3-6). The identified subset of symbols may also be defined in terms of mini-slot positions, as supported in NR operations.

It should be noted that the periodicity, represented in numbers of symbols, may be different for different SCS. For example, for SCS of 15 kHz: symbols 2, 7, n*14, where n={1, 2, 4, 5, 8, 10, 16, 20, 32, 40, 64, 80, 128, 160, 320, 640}, for SCS or 30 kHz: symbols 2, 7, n*14, where n={1, 2, 4, 5, 8, 10, 16, 20, 32, 40, 64, 80, 128, 160, 256, 320, 640, 1280}, and for SCS 60 kHz, with a normal cyclic prefix (CP), symbols 2, 7, n*14, where n={1, 2, 4, 5, 8, 10, 16, 20, 32, 40, 64, 80, 128, 160, 256, 320, 512, 640, 1280, 2560}.

The granularity for starting symbol 1 (504) may be different than the granularity for ending symbol 12 (505). At the end of CG resource 503, it may be beneficial to have an LBT gap 506 for base station 105 to perform a subsequent LBT procedure to reserve the next transmission opportunity. Thus, the granularity applied to ending symbol 12 (505) may account for LBT gap 506 prior to the ending boundary of slot 6 (e.g., LBT gap 506=25 μs, etc.). A similar type of ending gap has been defined in LTE license assisted access (LAA) operations for the UE based on whether the wants to share the channel occupancy time (COT). LBT gap 506 in slot 6 allows base station 105 to perform an LBT procedure (e.g., category 2 (cat-2), category 4 (cat-4), etc.) to secure access to the next slot boundary. For similar reasons, implementations of CG configuration 503 in NR-U network 50 may benefit from providing more than one end-symbol option. UE 115 may then be allowed to select which ending symbol option to use based on whether it wants to share the COT or not (similar to LAA). The ending symbol options may be limited to symbols from two sets. The first set comprising symbol at end of slot only or symbol locations just before PDCCH monitoring occasions of the UE. The second set comprising symbols that are X symbols earlier than the first set of symbols where X is the minimum number of symbols whose total duration is larger than the duration needed for cat-2 LBT (e.g., 25 μs).

Figure 14:
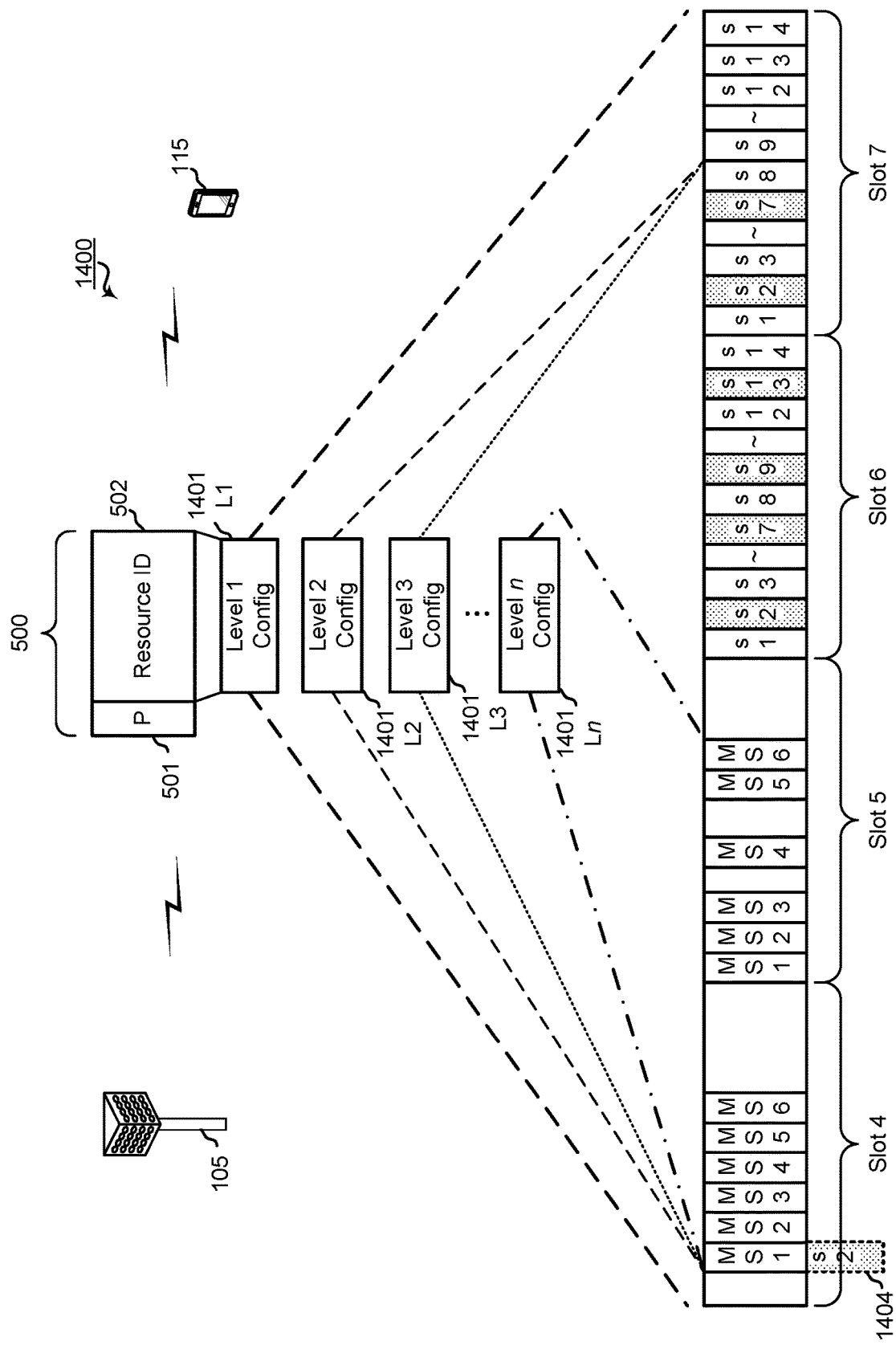
FIG. 14 is a block diagram illustrating a portion of a NR-U network having a base station and UE each configured according to one aspect of the present disclosure.

FIG. 14 is a block diagram illustrating a portion of NR-U network 1400 having base station 105 and UE 115 each configured according to another aspect of the present disclosure. As noted above with respect to FIG. 5, base station 105 may provide CG configuration information by signaling CG configuration message 500 to UE 115. CG configuration message 500 includes at least a periodicity 50, which identifies the period at which CG resources occur on the shared communication channel. CG configuration message 500 further includes resource identifier (ID) 502. According to the illustrated aspects of FIG. 14, resource ID 502 may be implemented using a set of hierarchical configurations sent in CG configuration message 500, in which a first level identifier (e.g., a first bitmap), level 1 configuration 1401-L1, may provide a coarse allocation of resources at a first granularity. Within these resources allocated through the coarse granularity, a second identifier, level 2 configuration 1401-L2, may include a finer granularity allocation, such as through another bitmap or one or more sets of RIV-type identifiers. Multiple hierarchies may, thus, provide a detailed and refined allocation of resources which becomes a progressively finer granularity from the first level identifier.

As illustrated in the example of FIG. 14, level 1 configuration 1401-L1 defines the CG resources as slots 4-7. Level 2 configuration 1401-L2 defines the starting symbol, symbol 2 (s2), of slot 4 and the ending symbol, symbol 8 (s8), of slot 7, of the CG resources over slots 4-7 defined in level 1 configuration 1401-L1. Level 3 configuration 1401-L3 defines the specific symbols within slots 4-7 beginning at symbol 2 of slot 4 and ending at symbol 8 of slot 7, as defined by level 1 configuration 1401-L1 and level 2 configuration 1401-L2. Level 3 configuration 1401-L3 defines slots 2, 7, 9 and 13 (s2, s7, s9, and s13) as the CG resource symbols within the defined CG resources. Because the CU resource ends at symbol 8 of slot 7, the allocated CG resources at symbols 9 and 13 will not be available to UE 115 in slot 7.

It should be noted that, while level 1 configuration 1401-L1 may comprise a bitmap to define the highest, coarsest span of the CG resources, the finer level configurations, level 2 configuration 1401-L2, level 3 configuration 1401-L3, and the like, may comprise either bitmaps or RIV-type identifiers.

In one implementation of the hierarchical configuration aspect, a recursive bitmap may be used in which the first bitmap, level 1 configuration 1401-L1, may provide configuration of CG resources at a first granularity (e.g., N1 slots, e.g., N1=10). A second bitmap, level 2 configuration 1401-L2, may provide configuration of the coarsely-defined set of CU resources at a second, finer granularity (e.g., N2 slots, e.g., N2=2) within the first granularity of N1 slots. This second bitmap, level 2 configuration 1401-L2, would apply to each bit that was set to 1 in the first bitmap, level 1 configuration 1401-L1. A third bitmap, level 3 configuration 1401-L3, may provide a further, even finer granularity (e.g., at symbol level or slot level etc.) of the CG resources defined within the second granularity.

At any particular level of the hierarchy, the bitmap length may be selected to be up to a predefined maximum value for that level (e.g., 30 bits, 40 bits, 50 bits, etc.). The periodicity may also be divided. For example, with a periodicity of 640 slots a length of the bitmap obtained in the CG configuration in level 1 configuration 1401-L1, may be selected at 40 bits, while a periodicity of 256 slots may be supported with a bitmap of a 32 bit length. The next bitmap, level 2 configuration 1401-L2 or level 3 configuration 1401-L3, may provide a slot level configuration, while the next further bitmap, level n configuration 1401-Ln, may provide a mini-slot configuration for mini-slots 1-6 (MS1-MS6) of slots 4 and 5. The number of recursive bitmaps 1-n may be a function of the periodicity or explicitly configured.

In an alternative example implementation of the hierarchical configuration aspect, the first level identifier, level 1 configuration 1401-L1, may comprise a bitmap of a first, coarse granularity, while the next level identifier, level 2 configuration 1401-L2, comprises a RIV type allocation at a finer granularity within the first, coarse granularity. For example, the first level bitmap, level 1 configuration 1401-L1, may provide radio frame level CG resource allocation, while the RIV type allocation of level 2 configuration 1401-L2 provides the starting slot/symbol and end slot symbol within the radio frame level resource. It should be noted that the start and end symbol configuration does not have to satisfy provide a start symbol that is less than the end symbol since the start symbol applies to the first slot and the end symbol applies to the last slot in a contiguously allocated burst of slots.

Figure 6:
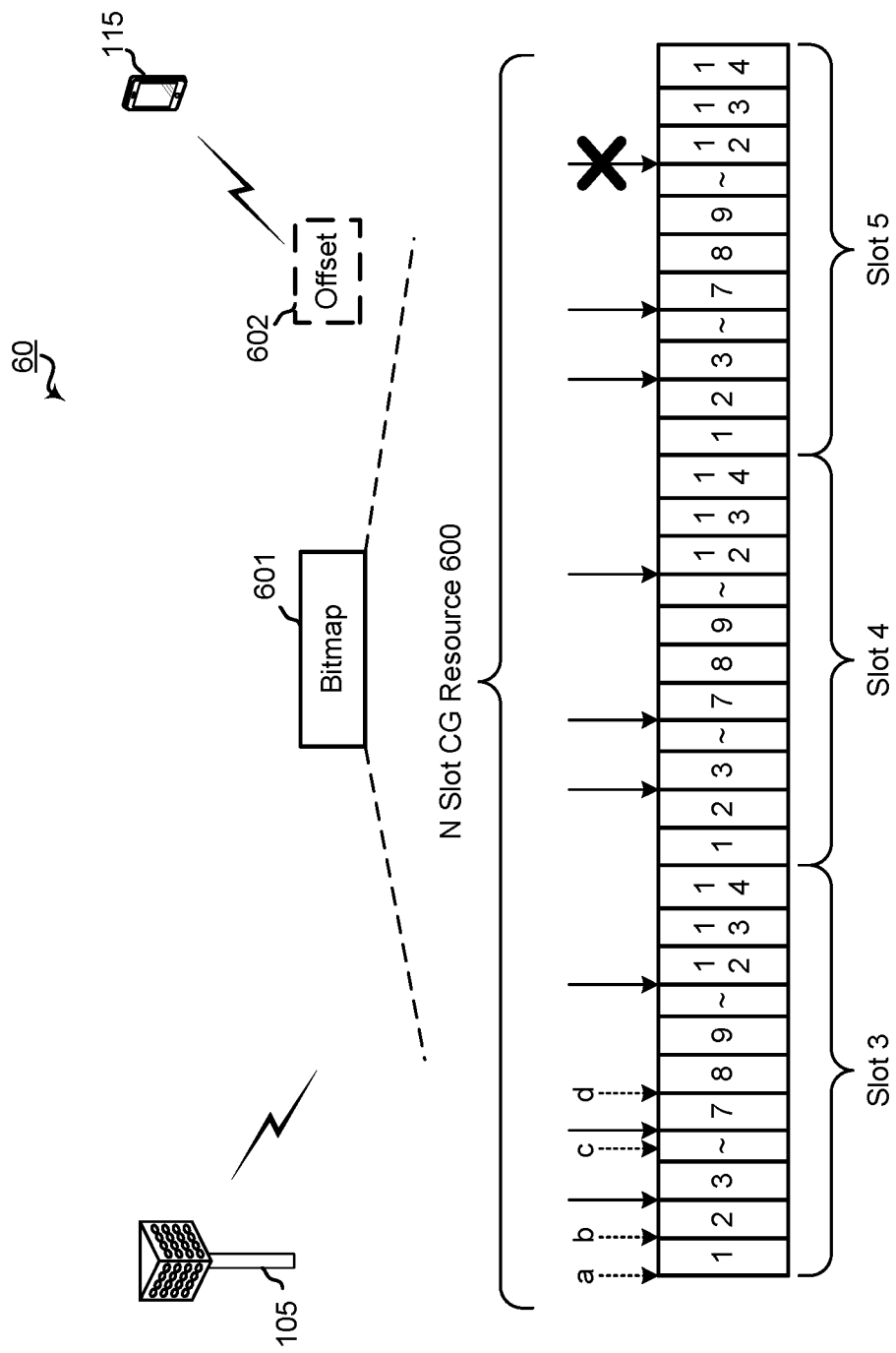
FIG. 6 is a block diagram illustrating a portion of a NR-U network having a base station and UE each configured according to one aspect of the present disclosure.

FIG. 6 is a block diagram illustrating a portion of NR-U network 60 having base station 105 and UE 115 each configured according to one aspect of the present disclosure. Within each of slots 3-5 reserved for CG resource 600, an indication may be provided for allowed starting points in each slot based on the LBT outcome. In a first optional implementation, there may be one starting point defined per slot (e.g., only at symbol 0 of slots 3-5). In a second optional implementation, multiple starting points may be defined per slot (e.g., symbols 0, 3, 7, and 12 of slots 3-5). The allowed starting point configuration may be signaled by base station 105 using a bitmap 601 transmitted to UE 115, in which the size of bitmap 601 can be based on the supported granularity. If bitmap 601 spans N slots, bitmap 601 would apply to every N slots starting at slot n modulo N. As noted above with reference to FIG. 5, the granularity of starting points may include any symbol among the first X symbols of slot 3 (e.g., slots 1(a), 2(b), and 3), a subset of slots (e.g., slots 2(b), 3, and 5(c), or a full slot operation (e.g., slots 1-14), either on a fixed basis or in which each slot is independently configured.

It should be noted that the configuration of starting point granularity may be different depending on whether the allocated slot is inside or outside of the base station COT.

According to additional aspects of the present disclosure, the starting point configuration may be the same for all configured slots except possibly for the first slot, slot 3, where UE 115 would be conducting an LBT procedure, and the last slot, slot 5, of the contiguously allocated burst, where the starting point may get limited or changed due to the different starting symbols and the ending symbols on those slots. For example, on the last configured slot, slot 5, if we configure a ending symbol of 13, a starting point may be allowed if it would support at least a given number symbols of transmissions. Where there must be three or more symbols of transmissions, symbol 12, which is configured as one of the possible starting symbols, would not be used in slot 5 because starting at symbol 12 would not allow at least three symbols of transmissions as ending symbol is 13. However, on other slots where ending symbol is 14 (total number of symbols in the slot), we can use starting position of 12 as that still allows three symbols to be transmitted.

On the first configured slot, slot 3, the starting point may be allowed at the configured start symbol, symbol 3, as well as the additional starting symbols as configured above (e.g., first 3 symbols, subset of symbols or full slot). For example, while the starting symbol configuration may identify symbol 3 as the starting symbol for the first CG slot resource, the starting symbols may further be configured for symbols 1(a), 2(b), 5(c), 8(d), and 12. It should be noted, however, that on top of the starting symbol configuration, each UE may have an additional starting point offset 602 configured on top of the starting symbol.

Configuration of starting point offset 602 was introduced to enable CG resource overloading. Collisions may be avoided by having different UEs start at different offsets. If starting point offset 602 is obtained randomly, then it may either be generated randomly for each allowed starting point in the slot, or upon generation of the random offset, that random offset may be applied to each starting point in the slot. However, at each different slot, a new random offset would be generated. These options for random offsets may be useful where punctured PUSCH are used to support the multiple starting points. In optional implementations where the offset is a fixed value, the same value would be used across the slot.

It should be noted that for each of the different starting points configured using the multiple starting symbols, either puncturing or rate matching may be used for UE 115 transmissions. Selection of puncturing or rate matching may be different depending on whether the transmissions are AUL or SUL. UE 115 may indicate whether puncturing or rate matching is used in such transmissions via signaling in the uplink control information (UCI) signal transmitted to base station 105.

Figure 7:
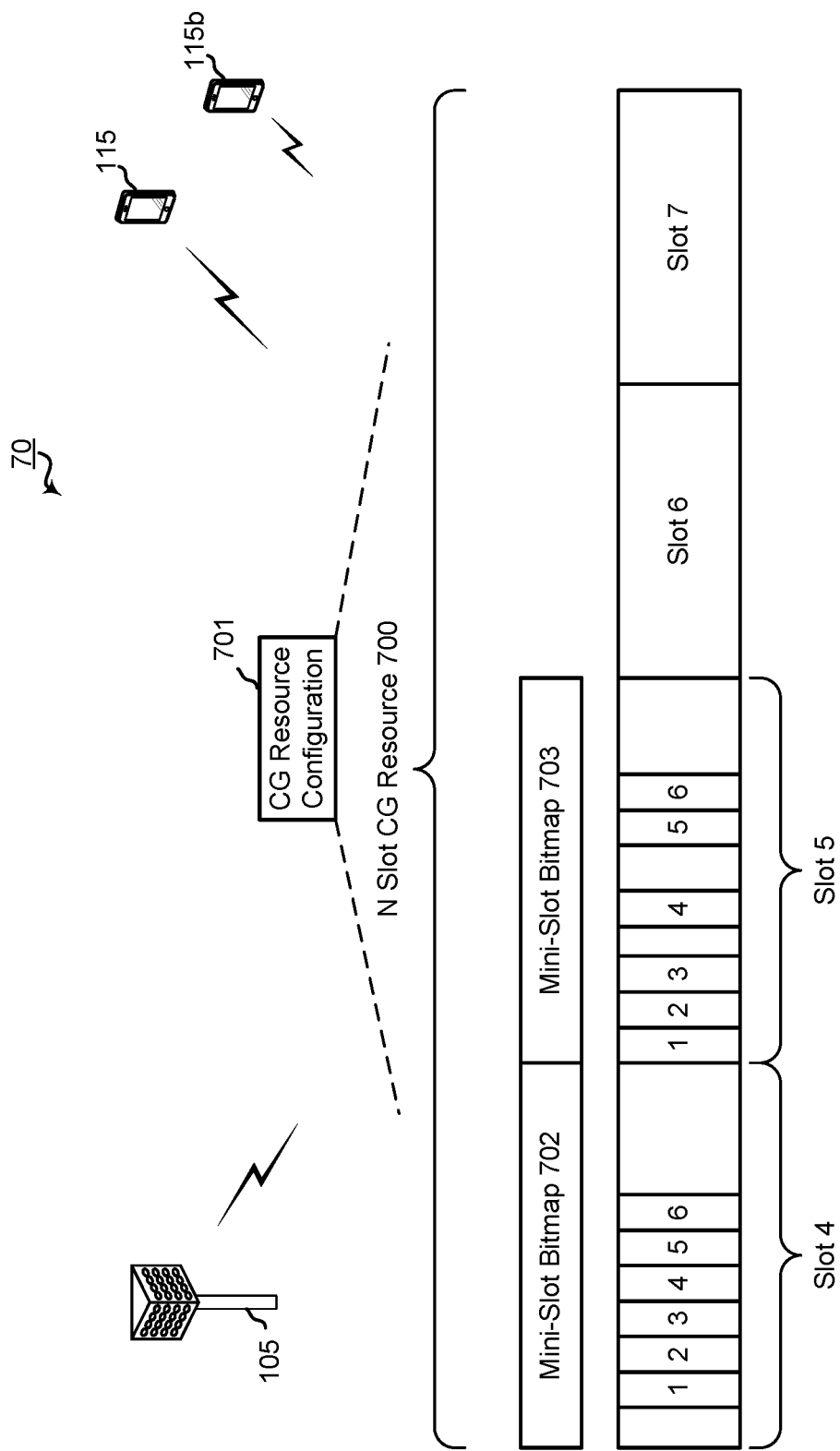
FIG. 7 is a block diagram illustrating a portion of a NR-U network having a base station and UE each configured according to one aspect of the present disclosure.

FIG. 7 is a block diagram illustrating a portion of NR-U network 70 having base station 105 and UE 115 each configured according to one aspect of the present disclosure. In configuring UE 115 for AUL transmissions, base station 105 may signal CG resource configuration 701 which configures an N slot CG resource 700, within which UE 115 may perform AUL transmissions. CG resource configuration 701 configures contiguous slots 4-7 for CG resource 700. Within the framework of an NR-U system, such as NR-U network 70, mini-slot allocations are supported for transmissions. Accordingly, base station 105 may provide two configurations in CG resource configuration 701 for any given CG uplink slot. These two configurations may be provided within the same CG configuration or come in two independent CG configurations. One configuration provides for mini-slot allocations, while the other configuration provides slot level allocations. UE 115 can then choose either configuration depending on its needs. The mini-slot configuration may be implemented as mini-slot bitmaps 702 and 703 on top of the slot level configuration for slots 4 and 5. Mini-slot bitmaps 702 and 703 would indicate the allowed starting points of each mini-slot 1-6 of slots 4 and 5. Thus, the length of each mini-slot would be from one starting point to next, configured to other values, or left to be selected by UE 115. Such a configuration may allow UE 115 to have more starting points in slots 4 and 5. For example with a slot level configuration at a 30 KHz SCS, UE 115 can start at the 0.5 ms boundary. However, this may cause a large gap between when UE 115 passes its LBT and when it can start transmitting. This large gap may allow other devices to jump in and start using the medium. Therefore, it may be more beneficial for UE 115 to have a finer granularity for initial access, such as by using configured mini-slots 1-6 of slots 4 and 5, and then switching to full slot transmissions at slots 6 and 7. In general, full slot transmission may be more efficient than mini-slot transmissions due to the lower overhead requirement. However, starting transmission using the mini-slots provides a better opportunity for UE 115 to successfully perform LBT and begin transmissions before allowing other nodes to take over the medium. When a bitmap is used to indicate the mini-slot configuration over N slots, the same bitmap may be applicable with periodicity of N slots (e.g. the bitmap is provided for one slot and the bitmap may apply to each allocated CG slot).

Because UE 115 may select to use either the mini-slot configurations via mini-slot bitmaps 702 and 703 or the full-slot configuration of slots 6 and 7, base station 105 would benefit from being able to detect which type of transmission was used on the given CG uplink slot. In one aspect, UE 115 may transmit in the CG uplink slot, slots 4-7, using a demodulation reference signal (DMRS) sequence associated with either mini-slot bitmaps 702 and 703 or full-slot configuration for slots 6 and 7. Both the position, indicated in terms of time and frequency of the DMRS, as well as the scrambling sequence can be used by the base station to detect which configuration has been used. In additional aspects or examples, where either the DMRS does not fully distinguish between a slot and mini-slot configuration, UE 115 may provide selection information in the CG UCI transmitted in slots 4-7, either through the payload or the location of the UCI. A UCI design, whether through payload information or implicit location, that allows for base station 105 to differentiate between full slot and mini-slot transmissions may help reduce any blind decoding by base station 105. Alternately, where neither a distinguishing DMRS nor UCI is provided, base station 105 would perform blind decoding of the CG UCI transmitted by UE 115 to determine whether the transmissions are full slot vs. minislot.

It should be noted that the mini-slot/full-slot modes may be supported with multiple LBT related starting points within a slot. When implemented with the above-described signaling techniques, base station 105 would be able to differentiate between slot based transmissions with multiple starting points within a slot as well as mini-slot transmissions with a slot.

In additional aspects of the present disclosure, the network may indicate whether and how many of the first few slots transmitted by UE 115 can be mini-slot based, after which the UE switches to the full slot based. Accordingly, base station 105 may signal to UE 115, such as in CG resource configuration 701, that UE 115 can use a mini-slot configuration, such as mini-slot bitmaps 702 and 703, for the first two slots, slots 4 and 5, of a given set of CG resources, such as CG resource 700. As noted above, in order to reduce the amount of blind decoding complexity for base station 105 for subsequent slots/mini-slots, UE 115 may indicate whether it uses the full slot/mini-slot configuration in the current UCI for future AUL transmissions.

According to the various aspects of the present disclosure, the UCI design may include the full offset related information, such as start symbol and starting point offset 602 (FIG. 6). Including the start symbol information into the UCI may cause the UCI to be re-encoded. Additionally, the UCI position may depend on the start symbol. Including starting point offset 602 and related information may further be helpful and, in some cases needed, when transport block (TB) size is based on starting point offset 602. The UCI designed according to the described aspects herein may further include mini-slot length information, identified from mini-slot bitmaps 702 and 703 (FIG. 7) and ending symbol related information, as identified in CG resource configuration 701. As noted above, the UCI can also indicate whether UE 115 has used the mini-slot configuration or the full slot configuration in the CG uplink transmissions over slots 4-7 (FIG. 7). The UCI may also include identification of any switching between the mini-slot configuration to the full slot configuration in upcoming CG transmissions in order to reduce base station blind decoding (e.g., switching from mini-slot configuration in slots 4 and 5 to full-slot configuration in slots 6 and 7).

Where multiple users (e.g., UEs 115 and 115*b*) are given the same CG resource 700 (e.g., AUL resources), it may also be useful to include the UE-identifier (ID) in the CG UCI transmitted by UEs 115 and 115*b* in order to signal base station 105 which UE is transmitting. However, in some cases, either UE 115 or 115*b* might be allocated UE-specific resources, or UEs 115 and 115*b* are given the same resources but are given different DMRS sequences, which allows base station 105 to identify the transmitting UE based on detecting the DMRS. In such aspects, UEs 115 and 115*b* may not have to include the UE-ID in the CG UCI. Accordingly, UEs 115 and 115*b* may be configured whether to include its UE-ID in the CG UCI via signaling from base station 105, such as RRC configuration signaling.

Figure 8:
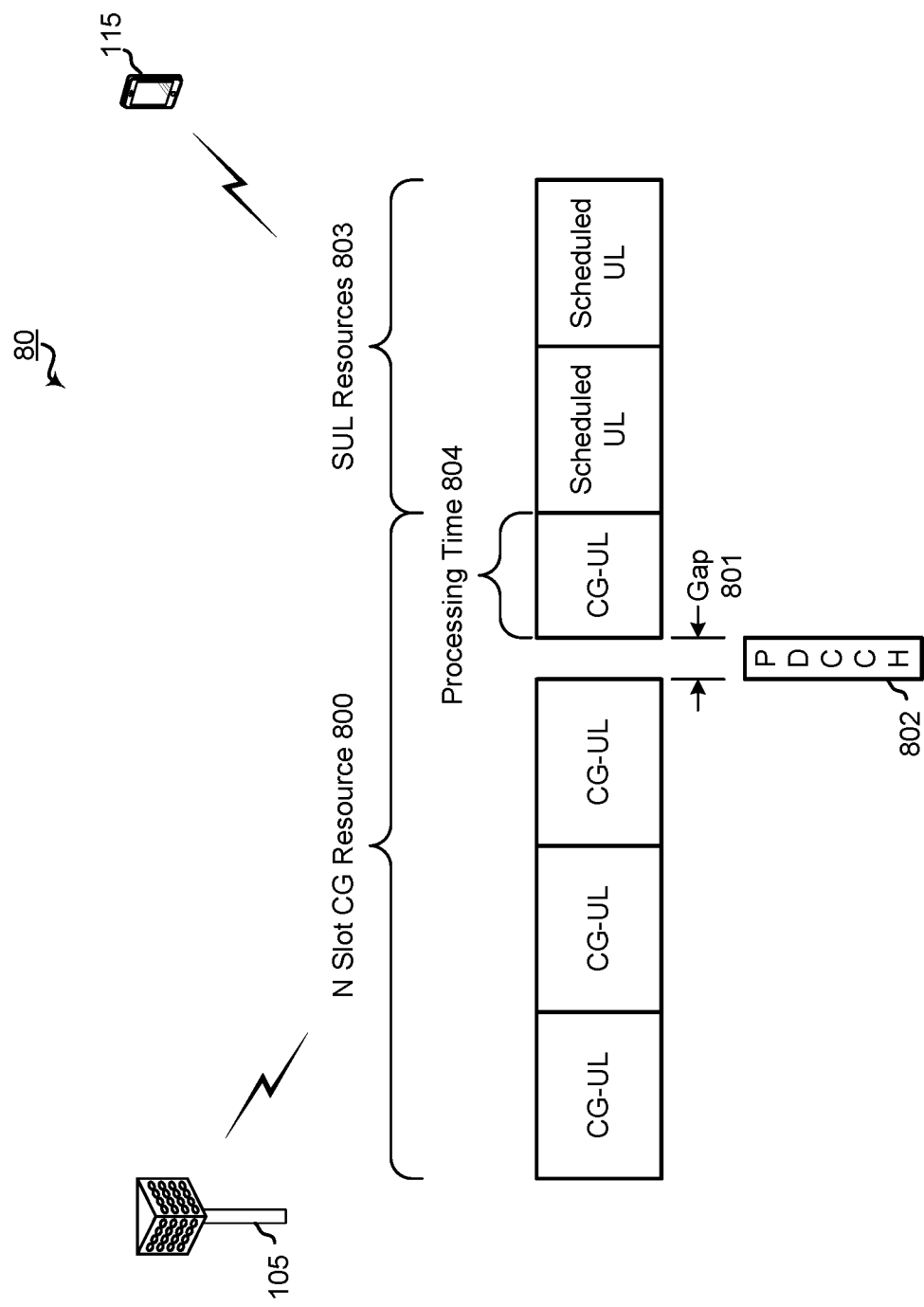
FIG. 8 is a block diagram illustrating a portion of a NR-U network having a base station and UE each configured according to one aspect of the present disclosure.

FIG. 8 is a block diagram illustrating a portion of NR-U network 80 having base station 105 and UE 115 each configured according to one aspect of the present disclosure. In configuring UE 115 for AUL transmissions, base station 105 signals CG configuration information which may identify N slots of CG resource 800 in which UE 115 may elect to perform AUL transmissions. According to additional aspects of the present disclosure, it may be beneficial to create a gap 801 for downlink signaling 802 (e.g., PDCCH) between the CG uplink resources of CG resource 800. Downlink signaling 802 may provide UE 115 with an uplink grant for SUL transmissions using SUL resources 803 configured. Gap 801 may be scheduled in such a manner that UE 115 will have contiguous CG AUL transmissions from CG resource 800 followed by SUL transmissions at SUL resources 803 without any transmission gaps other than gap 801. Gap 801 would be scheduled to accommodate processing time 804 between receiving the downlink grant at downlink signaling 802 and performing the SUL transmission at SUL resources 803. Gap 801 may be scheduled by base station 105 while configuring the AUL resources or may be autonomously scheduled by UE 115 (for example when it is allocated the entire bandwidth (BW)). In the example aspects where UE 115 autonomously schedules gap 801, it may include an indication of gap 801 in the UCI or COT indication information signaled to base station 105. Because UE 115 or base station 105 may not need to perform an LBT procedure, or, at a minimum, perform a short LBT (e.g., cat-2 LBT) instead of a full LBT procedure (e.g., cat-4 LBT) around this gap based on the gap between the end of UL signal and start of DL signal etc., those aspects would also be considered in the signaling. For example, UCI may provide information about any gap provided for LBT, type of LBT to use in the gap etc.

Additional aspects of the present disclosure may provide for time division resource allocation to be selected based on an activation command. In such aspects, base station 105 provides a configuration message that configures multiple options for time division resource allocation. The specific option to be selected by UE 115 may be triggered using an activation command in a downlink control information (DCI). Thus, the time divisional resource allocation may be fully configured in a self-contained DCI or the activation option may be used in which the DCI includes the activation command for UE 115 to select one of the preconfigured optional resource allocations.

Figure 9:
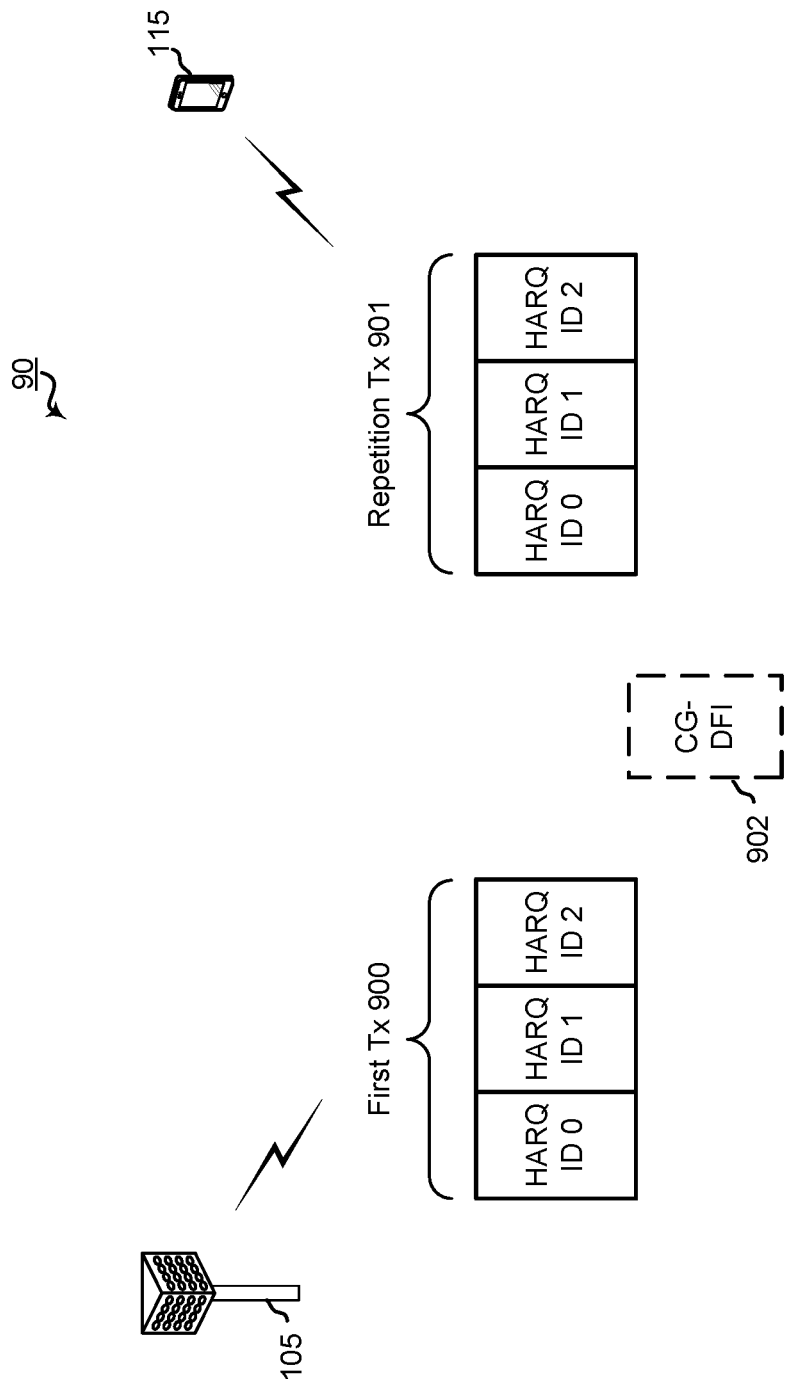
FIG. 9 is a block diagram illustrating a portion of a NR-U network having a base station in communication with a UE capable of AUL transmissions.

FIG. 9 is a block diagram illustrating a portion of NR-U network 90 having base station 105 in communication with UE 115, which is capable of AUL transmissions. NR and NR-U operations include the concept of repetition signaling. In such repetition signaling, uplink data packets may automatically be resent a certain number of times without necessity of first receiving a downlink feedback information (DFI) signal. For example, UE 115 sends UL data for HARQ ID 0-2 in first transmissions 900. If base station 105 detects the presence of the UL data in any of HARQ IDF 0-2, it may transmit DFI 902 to UE 115 provide ACK/NACK information on whether the HARQ process was successfully received or not. Typically UE 115 can resend a packet on receiving a NACK in the DFI or not receiving any DFI for a period of time. This incurs either DFI overhead (if DFI is sent to indicate a NACK) or latency (UE 115 has to wait for DFI not received timer expiry). With repetition configuration, such operation may be enhanced, as UE 115 is allowed to repeat the same packet even when DFI is not received/timer has not expired. If DFI 902 is not received, either because base station 105 fails to detect the transmissions of HARQ ID 0-2 or UE 115 does not successfully decode the DFI, UE 115 will send repetition transmissions 901 of HARQ ID 0-2 up to the configured number of repetitions. If DFI is received and it indicates an ACK, UE 115 can stop further repetitions of that packet thus avoiding UL overhead. Using such repetition functionality for CG AUL transmissions may be useful both to improve coverage and provide a faster retransmission mechanism.

According to aspects of the present disclosure, in order to improve coverage, back-to-back repetitions may be desirable. Additionally, because the data packets are retransmitted without need to first receive a DFI, repetitions provides a faster retransmission mechanism. Therefore, if base station 105 does not detect first transmissions 900 or is not able to send DFI 902, UE 115 would still retransmit repetition transmissions 901 based on the configured repetition pattern. However, if UE 115 receives DFI 902 indicating an acknowledgement for a particular HARQ process, UE 115 can then switch to a new TB instead of transmitting the configured repetition.

Figure 10:
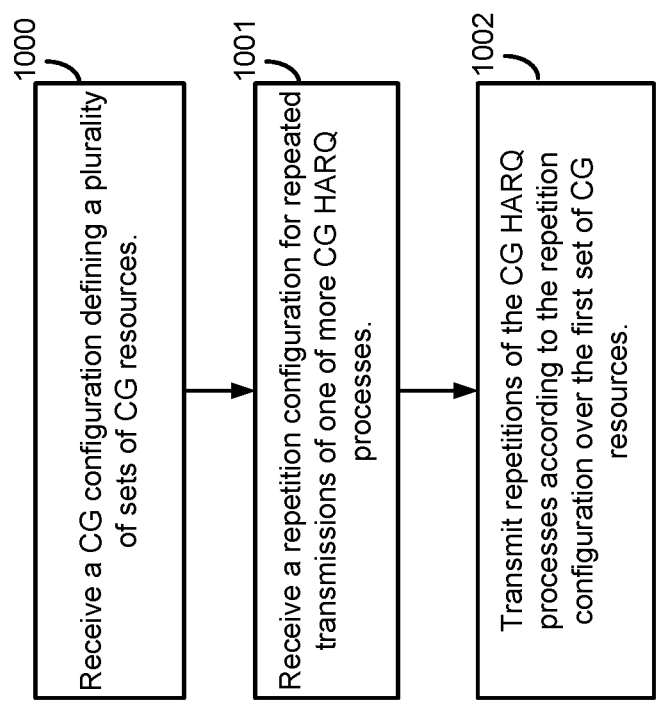
FIG. 10 is a block diagram illustrating example blocks executed to implement one aspect of the present disclosure.

FIG. 10 is a block diagram illustrating example blocks executed to implement one aspect of the present disclosure. The example blocks will also be described with respect to UE 115 as illustrated in FIG. 13.

At block 1000, a UE receives a CG configuration defining a plurality of sets of CG resources. A serving base station configures the plurality of sets of resources for CG communications and transmits the CG configuration to one or more served UEs. UE 115 receives a CG configuration message from the serving base station via antennas 252a-r and wireless radios 1300a-r. Under control of controller/processor 280, UE 115 decodes and stores the configuration information in memory 282 at CG configuration 1301. The serving base station includes a periodicity of CG resources along with a resource identifier that identifies M sets of N slot CG resources for CG configuration in the CG configuration information transmitted by the serving base station and received by UE 115.

At block 1001, the UE receives, a repetition configuration for repeated transmissions of one of more CG HARQ processes, wherein the repetition configuration includes a first repetition factor defining a first number of back-to-back repetitions over contiguous slots of a first set of CG resources of the plurality of sets of CG resources, and a second repetition factor defining a second number of repetitions performed after a minimum gap time in slots of the first set of CG resources. The serving base station further signals a repetition configuration that includes repetition factors. UE 115 receives the repetition configuration message from the serving base station via antennas 252a-r and wireless radios 1300a-r. Under control of controller/processor 280, UE 115 decodes and stores the repetition configuration information in memory 282 at repetition configuration 1305. Repetition configuration 1305 includes the specific type repetition configurations (type 1 and type 2 repetitions) for repetitions transmissions.

At block 1002, the UE transmits repetitions of the one or more CG HARQ processes according to the repetition configuration over the first set of CG resources. As UE 115 has data to transmit in data buffer 1302 or has HARQ process feedback information for transmit, UE 115, under control of controller/processor 280, executes LBT logic 1303, stored in memory 282. The execution environment of LBT logic 1303 provides UE 115 with the functionality for performing an LBT procedure (clear channel assessment (CCA), cat-2 LBT, cat-4 LBT, etc.). The LBT procedure may be performed at the next available CG starting position in the current CG resource slot. Upon detection of a successful LBT procedure, UE 115, within the execution environment of AUL transmission logic 1304, transmits the repetitions to the serving base station according to repetition configuration 1305, in memory 282, via wireless radios 1300a-r and antennas 252a-r. UE 115, under control of controller/processor 280, initiates DFI timer 1306 when the repetitions begin transmission. UE 115 will monitor for any DFI received via antennas 252a-r and wireless radios 1300a-r during the running DFI timer 1306. If a DFI is received, UE 115 will end transmissions of the repetitions.

FIGS. 11A-11E are block diagrams illustrating a portion of NR-U networks 1100-1104 having base station 105 and UE 115 each configured according to aspects of the present disclosure. To support the benefits of repetition for back-to-back and after gap repetitions, CG in NR-U networks, such as NR-U networks 1100-1104 can be configured using two repetition factors. A first repetition factor (type 1 repetition) is applicable for back-to-back repetitions in CG resources (R_T1). The second repetition factor (type 2 repetition) is primarily for repetitions with gaps (R_T2). For the second repetition factor, it can be mandated to occur across non-contiguously allocated CG resources and/or after a minimum gap in time. For example, the time of the gap can be defined relative to the first repetition factor or either the last type 1 repetition or previous type 2 repetition. When implementing the type 2 repetitions, the transmissions may be required to cycle through every CG HARQ process for which UE 115 has data. In various aspects of the present disclosure the type and order in which to do the repetition may also be left up to UE implementation where, the total maximum repetitions=R_T1*R_T2. A DFI timer expiry would start after the total maximum repetitions are completed. After DFI timer expiry, there can be another R_T1*R_T2 repetitions. A DFI negative acknowledgment (NACK) can also trigger another set of type 1+type 2 repetition.

As illustrated in FIGS. 11A-11E, base station 105 signals CG configuration information to UE 115 that defines CG resources 1105. CG resources 1105 includes two sets of contiguous slots separated by a gap that meets the minimum gap described above. For the type 1 repetition factor, there may be several different options for performing the repetitions. For example, in a first optional aspect, the is full flexibility in type 1 repetitions but type 2 repetitions have restrictions. Alternatively, type 1 repetitions may have similar restrictions as noted above, but which are different than the restrictions for the type 2 repetitions. On reception of the DFI between type 1 repetitions the remaining repetitions are dropped. In FIG. 11A-11E, there are 3 repetitions configured for type 1. UE does up to 3 repetitions for a HARQ ID before moving on to perform transmissions of next HARQ ID.

Figure 11A:
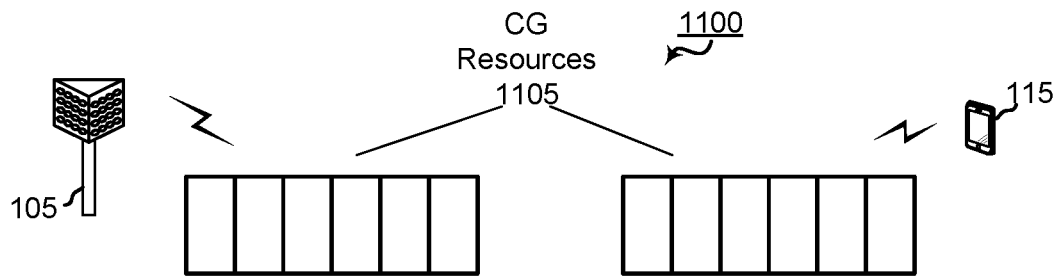
FIGS. 11A-11E are block diagrams illustrating a portion of NR-U networks having a base station and UE each configured according to aspects of the present disclosure.
Figure 11B:

In an additional optional aspect as illustrated in FIG. 11B, repetitions can start at any resource and keep repeating until all of the configured repetitions are completed (even if the CG resources are not contiguous). Thus, after UE 115 identifies an LBT pass, it may begin back-to-back, type 1 repetitions. Even where the CG resources are not contiguous, as progressing between the two contiguous sections of CG resources 1105, UE 115 would continue any interrupted repetitions after a next LBT pass.

Figure 11C:
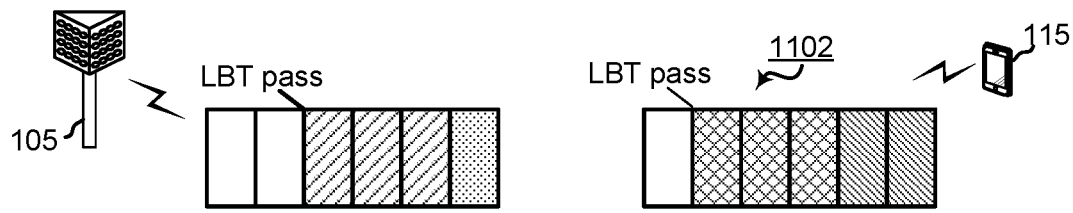

A further additional aspect illustrated in FIG. 11C provides for repetitions that can start at any resource and are continued until contiguous repetitions are feasible. Thus, UE 115 begins the type 1 repetitions of the different HARQ processes after detecting the LBT pass, at the gap, any remaining repetitions of the current set are dropped. After detecting the LBT pass in the next contiguous block of CG resources 1105, where contiguous repetitions are feasible again, UE 115 begins transmitting the next full set of HARQ process repetitions.

Figure 11D:
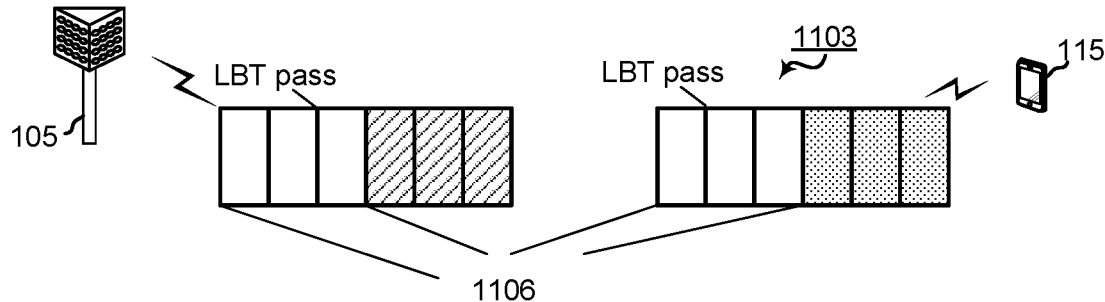
Figure 11E:
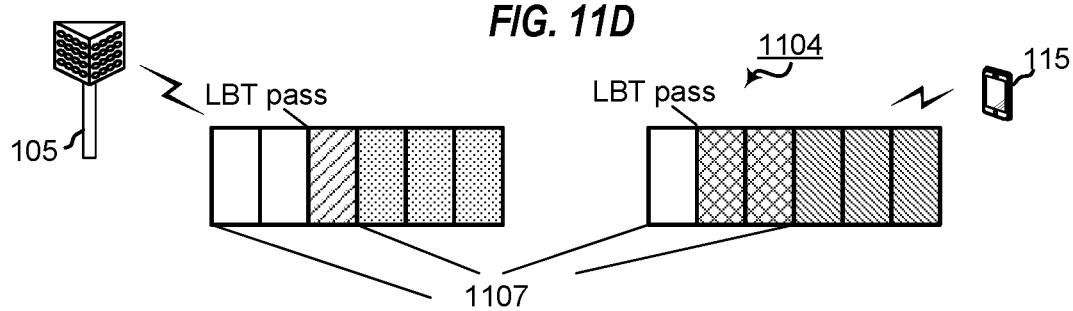

In another additional aspect as illustrated in FIG. 11D, repetitions can start at specific points 1106, such that R_T1 contiguous repetitions can be accommodated. As illustrated, UE 115 detects the LBT pass between specific starting points 1106. UE 115 will not transmit the HARQ process data unless there are enough resources to fully transmit the R_T1 repetitions. In a further alternative aspect illustrated in FIG. 11E, repetitions can start at specific points 1107, but without the restriction of accommodating R_T1 contiguous repetitions. Thus, on detecting LBT pass between specific points 1107, UE 115 will transmit as many repetitions as there are available slots before the next one of specific points 1107.

It should be noted that further alternative aspects provide for repetition groups that may be defined in which type 1 repetitions are only within the repetition group, while transmission across groups are considered type 2 repetitions. Still further alternative aspects may allow for easier soft combing of UCI transmissions as well across repetitions.

According to the various aspects of the present disclosure, UE 115 may either be mandated to transmit the repetitions or may select how to transmit repetitions. For example, during configuration, the path loss experienced was not sufficient, in which a certain level of repetition is configured. However, after a period, the path loss has improved to a level at which UE 115 may determine that no automatic repetitions are necessary. In such aspects, UE 115 may elect to stop the repetitions and repeat transmissions when base station 105 explicitly asks for repetition/retransmission. This may be applicable either for both type 1 and type 2 repetitions, for type 1 repetitions but not to type 2 repetitions, or not mandated at all.

UE 115 may also send UCI in FIGS. 11A-11E either in the first repetition of a type 2 repetition, or in each repetition of type 2 repetition. The UCI may provide information about the repetition number either for the type 2 repetition number, or for both type 1 and type 2 repetition numbers. This additional repetition information may aid base station 105 in determining whether it should send a DFI or not.

It should be noted that the number of resources/coding rate of the UCI may be a function of the configured repetition factors.

In an additional aspect of the present disclosure, a DFI from base station 105 can contain transmit power control (TPC) commands in order to control transmission power at UE 115. When a DFI is not received at UE 115, UE 115 can step up its power upon timeout of the DFI reception timer. This power step-up may also be based on not receiving other TPC-related commands as well while the DFI timer is running. Otherwise, UE 115 may use same power as previous transmissions.

Figure 12:
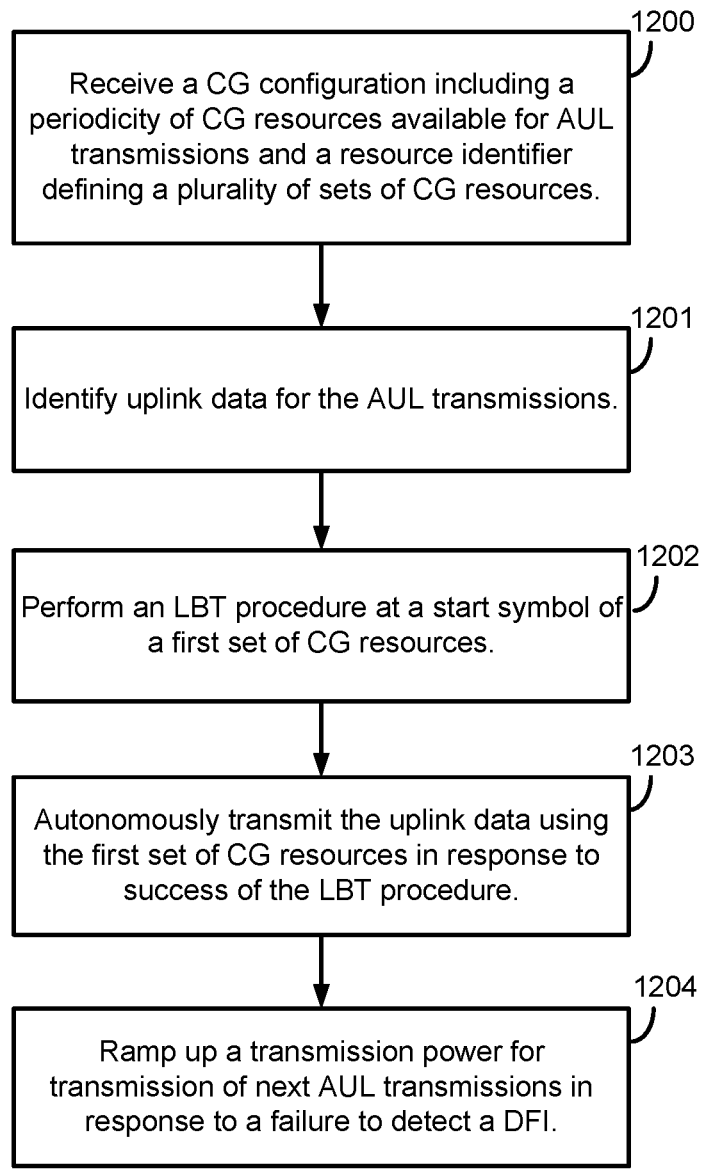
FIG. 12 is a block diagram illustrating example blocks executed to implement one aspect of the present disclosure.

FIG. 12 is a block diagram illustrating example blocks executed to implement one aspect of the present disclosure. The example blocks will also be described with respect to UE 115 as illustrated in FIG. 13.

At block 1200, a UE receives a CG configuration including a periodicity of CG resources available for AUL transmissions and a resource identifier defining a plurality of sets of CG resources. UE 115 receives a CG configuration message from a serving base station via antennas 252*a-r* and wireless radios 1300*a-r*. Under control of controller/processor 280, UE 115 decodes and stores the configuration information in memory 282 at CG configuration 1301. The CG configuration information includes a periodicity of CG resources along with a resource identifier that identifies M sets of N slot CG resources for CG configuration.

At block 1201, the UE identifies uplink data for the AUL transmissions and, at block 1202, performs an LBT procedure at a start symbol of a first set of CG resources of the plurality of sets of CG resources. If UE 115 detects uplink data in memory 282 at data buffer 1302, it may determine, under control of controller/processor 280 to execute AUL transmission logic 1304. The execution environment of AUL transmission logic 1304 provides the functionality of UE 115 to perform AUL communication using CG resources defined by the information in CG configuration 1301. In preparation for AUL transmission, UE 115, under control of controller/processor 280, executes LBT logic 1303, stored in memory 282. The execution environment of LBT logic 1303 provides UE 115 with the functionality for performing an LBT procedure (clear channel assessment (CCA), cat-2 LBT, cat-4 LBT, etc.). Within the execution environment of AUL transmission logic 1304, the LBT procedure may be performed at the next available CG starting position in the current CG resource slot.

At block 1203, the UE autonomously transmits the uplink data using the first set of CG resources in response to success of the LBT procedure. Upon detection of a successful LBT procedure, UE 115, within the execution environment of AUL transmission logic 1304, prepares an AUL transmission for the CG resources and transmits the data autonomously via wireless radios 1300*a-r* and antennas 252*a-r*.

At block 1204, the UE ramps up a transmission power for transmission of next AUL transmissions in response to a failure of the UE to detect a downlink feedback information (DFI) indicating successful decoding of the AUL transmissions from a serving base station. UE 115, under control of controller/processor 280, initiates DFI timer 1306 when the AUL transmissions begin. UE 115 will monitor for any DFI received via antennas 252*a-r* and wireless radios 1300*a-r* during the running DFI timer 1306. If UE 115 fails to detect or receive a DFI from the serving base station, UE 115, under control of controller/processor 280, executes TPC logic 1307. The execution environment of TPC logic 1307 ramps up the transmission power at UE 115 for the next transmissions of the data.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 4, 10, and 12 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various aspects of the present disclosure may be implemented in many different ways, including methods, processes, non-transitory computer-readable medium having program code recorded thereon, apparatus having one or more processors with configurations and instructions for performing the described features and functionality, and the like. A first aspect of wireless communication includes receiving, by a UE, a CG configuration including a periodicity of CG resources available for AUL transmissions and a resource identifier defining a plurality of sets of CG resources, identifying, by the UE, uplink data for the AUL transmissions, performing, by the UE, a LBT procedure at a start symbol of a first set of CG resources of the plurality of sets of CG resources, and transmitting, by the UE, the uplink data using the first set of CG resources in response to success of the LBT procedure.

A second aspect, based on the first aspect, wherein the resource identifier includes a bitmap identifying the plurality of sets of CG resources when the periodicity is less than a threshold period and a RIV identifying the plurality of sets of CG resources when the periodicity exceeds the threshold period.

A third aspect, based on the first aspect, wherein the resource identifier indicates a start symbol of a first slot of each of the plurality of sets of CG resources and an end symbol of a last slot of each of the plurality of sets of CG resources, and wherein the start symbol and the end symbol are one of: independently configured for each of the plurality of sets of CG resources, or commonly configured for all of the plurality of sets of CG resources.

A fourth aspect, based on the third aspect, wherein the start symbol is selected by the UE from one of: a predefined number of first symbols of the first slot, a subset of symbols of the first slot, or any symbol of the first slot.

A fifth aspect, based on the third aspect, wherein the end symbols is selected by the UE from a set of end symbols of the last slot no closer to a boundary of a next slot than an LBT gap.

A sixth aspect, based on the first aspect, further including receiving, by the UE, an allowed starting point configuration bitmap identifying one or more allowed starting points in each slot of each of the plurality of sets of CG resources, wherein the uplink data is transmitted at a first available starting point of the one or more allowed starting points of a first slot of the first set of CG resources after the success of the LBT procedure.

A seventh aspect, based on the sixth aspect, further including generating, by the UE, a random UE-specific starting point offset, wherein the uplink data is transmitted at the random UE-specific starting point offset after the first available starting point, wherein the random UE-specific starting point offset is one of: different for each of the one or more allowed starting points in each slot of each of the plurality of sets of CG resources or applied to the one or more allowed starting points within each slot and different for each slot of each of the plurality of sets of CG resources.

An eighth aspect, based on the first aspect, wherein the resource identifier includes a mini-slot level configuration of the plurality of sets of CG resources and a full-slot level configuration of the plurality of sets of CG resources.

A ninth aspect, based on the eighth aspect, further including receiving, by the UE, a mini-slot configuration bitmap, wherein the mini-slot configuration bitmap defines a set of available mini-slots within each slot configured with the full-slot level configuration of the plurality of sets of CG resources.

A tenth aspect, based on the ninth aspect, wherein a first value in the mini-slot configuration bitmap indicates a valid starting position of a mini-slot of the set of available mini-slots and a second value in the mini-slot configuration bitmap indicates an invalid starting position for any slot of the set of available mini-slots.

An eleventh aspect, based on the ninth aspect, wherein a length of each of the set of available mini-slots is indicated according to one of a length indicator received by the UE, each portion of a slot over which the mini-slot configuration bitmap defines the set of available mini-slots, wherein the portion is indicated by boundaries of the slot and a start position of each of the set of available mini-slots identified by a bit in the mini-slot configuration bitmap.

A twelfth aspect, based on the ninth aspect, further including transmitting, by the UE, a slot configuration identifier indicating whether the uplink data transmitted was transmitted using one or more of the set of available mini-slots or one or more slots of the full-slot level configuration, wherein the slot configuration identifier includes one or more of: a demodulation reference signal configured according to one of the mini-slot level configuration or the full-slot level configuration, or an uplink control information indicative of one of the mini-slot level configuration or the full-slot level configuration.

A thirteenth aspect, based on the eighth aspect, further including receiving, by the UE, a mini-slot window indication identifying a maximum number of slots within the first set of CG resources in which the UE may transmit the uplink data according to the mini-slot level configuration.

A fourteenth aspect, based on the first aspect, further including receiving, by the UE, a identifier (ID) trigger from a serving base station, wherein the ID trigger signals the UE to include a UE ID in a CG uplink control information message, and transmitting, by the UE, the CG uplink control information message with the UE ID in response to the ID trigger.

A fifteenth aspect, based on the fourteenth aspect, wherein the ID trigger is received in one of an RRC configuration message configuring the CG resources available for AUL transmissions, or an activation DCI message activating the AUL transmissions.

A sixteenth aspect, based on the first aspect, further including providing, by the UE, a gap within the first set of CG resources, wherein the gap is located at least a downlink processing time from an ending boundary of a last slot of the first set of CG resources, receiving, by the UE, an uplink grant from a serving base station within the gap, wherein the uplink grant identifies SUL resources contiguous to the first set of CG resources, ending, by the UE, the autonomous transmitting by the ending boundary, and transmitting, by the UE, uplink data using the SUL resources.

A seventeenth aspect of wireless communication includes receiving, by a UE, a CG configuration defining a plurality of sets of CG resources, receiving, by the UE, a repetition configuration for repeated transmissions of one of more CG HARQ processes, wherein the repetition configuration includes two or more repetition factors, detecting, by the UE, a DFI associated with a CG HARQ process of the one or more CG HARQ processes, wherein the DFI is detected between repetitions according to a first repetition factor of the two or more repetition factors, dropping, by the UE, remaining repetitions of the CG HARQ process remaining according to the first repetition factor when the DFI indicates the CG HARQ process has been successfully decoded, and transmitting, by the UE, repetitions of the one or more CG HARQ processes over the first set of CG resources according to one or more additional repetition factors of the two or more repetition factors.

An eighteenth aspect, based on the seventeenth aspect, wherein the two or more repetition factors includes a first repetition factor defining a first number of back-to-back repetitions over contiguous slots of a first set of CG resources of the plurality of sets of CG resources, and a second repetition factor defining a second number of repetitions performed after a minimum gap time in slots of the first set of CG resources A nineteenth aspect, based on the seventeenth aspect, further including transmitting, by the UE, a CG UCI message in one of: a first repetition according to a second repetition factor of the two or more repetition factors or each repetition according to the second repetition factor, wherein the UCI includes a repetition number associated with one of: repetitions according to the second repetition factor or repetitions according to the first repetition factor and the second repetition factor.

A twentieth aspect of wireless communication includes receiving, by a UE, a CG configuration including a periodicity of CG resources available for AUL transmissions and a set of hierarchical resource configurations defining a plurality of sets of CG resources, wherein a first configuration of the set of hierarchical resource configurations define a coarse span of a CG resource and subsequent configurations of the set of hierarchical resource configurations refine the definition of the coarse span to identify the plurality of sets of CG resources, identifying, by the UE, uplink data for the AUL transmissions, performing, by the UE, a LBT procedure at a start symbol of a first set of CG resources of the plurality of sets of CG resources, and autonomously transmitting, by the UE, the uplink data using the first set of CG resources in response to success of the LBT procedure.

A twenty-first aspect, based on the twentieth aspect, wherein each configuration of the set of hierarchical resource configurations includes one of a bitmap identifying the CG resource or a RIV identifying the CG resource.

A twenty-second aspect, based on the twentieth aspect, wherein a length of each configuration of the set of hierarchical resource configurations is selected up to a predefined maximum value.

A twenty-third aspect, based on the twenty-second aspect, wherein the length is selected within the predefined maximum value based on the periodicity.

A twenty-fourth aspect, based on the twentieth aspect, wherein a number of configurations within the set of hierarchical resource configurations is one of explicitly configured by a serving base station, or derived as a function of the periodicity The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   receiving, by a user equipment (UE), a configured grant (CG) configuration including a periodicity of CG resources available for CG transmissions and a resource indicator value (RIV) identifying a plurality of sets of CG resources including a plurality of slots, wherein the RIV includes a first RIV identifying a mini-slot level configuration of the plurality of sets of CG resources and a second RIV identifying a full-slot level configuration of the plurality of sets of CG resources;
   performing, by the UE, a listen before talk (LBT) procedure at a starting location of a first set of CG resources of the plurality of sets of CG resources, wherein the first set of CG resources includes a plurality of starting locations within a slot of the plurality of slots, wherein performing the LBT procedure includes continuing to perform the LBT procedure at one or more of the plurality of starting locations until the LBT procedure is successful, wherein the first set of CG resources includes a plurality of consecutive uplink data transmission allocations within the slot of the plurality of slots; and
   transmitting, by the UE, uplink data using the first set of CG resources in response to success of the LBT procedure.

2. The method of claim 1, wherein:
   the CG configuration includes a resource identifier that indicates a start symbol of a first slot of each of the plurality of sets of CG resources and an end symbol of a last slot of each of the plurality of sets of CG resources, and
   the start symbol and the end symbol are one of: independently configured for each of the plurality of sets of CG resources, or commonly configured for all of the plurality of sets of CG resources.

3. The method of claim 2, wherein the start symbol is selected by the UE from one of: a predefined number of first symbols of the first slot, a subset of symbols of the first slot, or any symbol of the first slot.

4. The method of claim 2, wherein the end symbol is selected by the UE from a set of end symbols of the last slot no closer to a boundary of a next slot than an LBT gap.

5. The method of claim 1, further including:
   receiving, by the UE, an allowed starting point configuration bitmap identifying one or more allowed starting points in each slot of each of the plurality of sets of CG resources, wherein the uplink data is transmitted at a first available starting point of the one or more allowed starting points of a first slot of the first set of CG resources after the success of the LBT procedure.

6. The method of claim 5, further including:
   generating, by the UE, a random UE-specific starting point offset, wherein the uplink data is transmitted at the random UE-specific starting point offset after the first available starting point, wherein the random UE-specific starting point offset is one of: different for each of the one or more allowed starting points in each slot of each of the plurality of sets of CG resources or applied to the one or more allowed starting points within each slot and different for each slot of each of the plurality of sets of CG resources.

7. The method of claim 1, wherein the first RIV defines a set of available mini-slots within each slot configured with the full-slot level configuration of the plurality of sets of CG resources.

8. The method of claim 7, wherein a length of each of the set of available mini-slots is indicated according to one of:
   a length indicator received by the UE; or
   each portion of a slot over which the first RIV defines the set of available mini-slots, wherein the portion is indicated by boundaries of the slot and a start position of each of the set of available mini-slots identified by the first RIV.

9. The method of claim 7, further including:
transmitting, by the UE, a slot configuration identifier indicating whether the uplink data transmitted was transmitted using one or more of the set of available mini-slots or one or more slots of the full-slot level configuration, wherein the slot configuration identifier includes one or more of: a demodulation reference signal configured according to one of the mini-slot level configuration or the full-slot level configuration, or an uplink control information indicative of one of the mini-slot level configuration or the full-slot level configuration.

10. The method of claim 1, further including:
receiving, by the UE, a mini-slot window indication identifying a maximum number of slots within the first set of CG resources in which the UE may transmit the uplink data according to the mini-slot level configuration.

11. The method of claim 1, further including:
receiving, by the UE, a identifier (ID) trigger from a serving base station, wherein the ID trigger signals the UE to include a UE ID in a CG uplink control information message; and
transmitting, by the UE, the CG uplink control information message with the UE ID in response to the ID trigger.

12. The method of claim 11, wherein the ID trigger is received in one of:
a radio resource control (RRC) configuration message configuring the CG resources available for CG transmissions, or
an activation downlink control information (DCI) message activating the CG transmissions.

13. The method of claim 1, further including:
providing, by the UE, a gap within the first set of CG resources, wherein the gap is located at least a downlink processing time from an ending boundary of a last slot of the first set of CG resources;
receiving, by the UE, an uplink grant from a serving base station within the gap, wherein the uplink grant identifies scheduled uplink (SUL) resources contiguous to the first set of CG resources;
ending, by the UE, the transmitting by the ending boundary; and
transmitting, by the UE, uplink data using the SUL resources.

14. A method of wireless communication, comprising:
receiving, by a user equipment (UE), a configured grant (CG) configuration including a periodicity of CG resources available for CG transmissions and a set of hierarchical resource configurations defining a plurality of sets of CG resources including a plurality of slots, wherein a first configuration of the set of hierarchical resource configurations define a coarse span of a CG resource and subsequent configurations of the set of hierarchical resource configurations refine the definition of the coarse span to identify the plurality of sets of CG resources, and wherein each configuration of the set of hierarchical resource configurations includes a resource indicator value (MV) identifying the CG resource;
identifying, by the UE, uplink data for the CG transmissions;

performing, by the UE, a listen before talk (LBT) procedure at a starting location of a first set of CG resources of the plurality of sets of CG resources, wherein the first set of CG resources includes a plurality of starting locations within a slot of the plurality of slots, wherein performing the LBT procedure includes continuing to perform the LBT procedure at one or more of the plurality of starting locations until the LBT procedure is successful, wherein the first set of CG resources includes a plurality of consecutive uplink data transmission allocations within the slot of the plurality of slots; and
transmitting, by the UE, the uplink data using the first set of CG resources in response to success of the LBT procedure.

15. The method of claim 14, wherein each configuration of the set of hierarchical resource configurations further includes one of a bitmap identifying the CG resource.

16. The method of claim 14, wherein a length of each configuration of the set of hierarchical resource configurations is selected up to a predefined maximum value.

17. The method of claim 16, wherein the length is selected within the predefined maximum value based on the periodicity.

18. The method of claim 14, wherein a number of configurations within the set of hierarchical resource configurations is one of explicitly configured by a serving base station, or derived as a function of the periodicity.

19. An apparatus configured for wireless communication, the 28. apparatus comprising:
at least one processor; and
a memory coupled to the at least one processor, wherein the at least one processor is configured to:
receive, by a user equipment (UE), a configured grant (CG) configuration including a periodicity of CG resources available for CG transmissions, a resource indicator value (RIV) identifying a plurality of sets of CG resources including a plurality of slots, wherein the RIV includes a first RIV identifying a mini-slot level configuration of the plurality of sets of CG resources and a second RIV identifying a full-slot level configuration of the plurality of sets of CG resources;
perform, by the UE, a listen before talk (LBT) procedure at a starting location of a first set of CG resources of the plurality of sets of CG resources, wherein the first set of CG resources includes a plurality of starting locations within a slot of the plurality of slots, wherein performing the LBT procedure includes continuing to perform the LBT procedure at one or more of the plurality of starting locations until the LBT procedure is successful, wherein the first set of CG resources includes a plurality of consecutive uplink data transmission allocations within the slot of the plurality of slots; and
transmit, by the UE, uplink data using the first set of CG resources in response to success of the LBT procedure.

20. The apparatus of claim 19,
wherein the CG configuration includes a resource identifier that indicates a start symbol of a first slot of each of the plurality of sets of CG resources and an end symbol of a last slot of each of the plurality of sets of CG resources, and
wherein the start symbol and the end symbol are one of:
independently configured for each of the plurality of sets of CG resources, or commonly configured for all of the plurality of sets of CG resources.

21. An apparatus configured for wireless communication, the apparatus comprising:
   at least one processor; and
   a memory coupled to the at least one processor,
   wherein the at least one processor is configured to:
      receive, by a user equipment (UE), a configured grant (CG) configuration including a periodicity of CG resources available for CG transmissions and a set of hierarchical resource configurations defining a plurality of sets of CG resources including a plurality of slots, wherein a first configuration of the set of hierarchical resource configurations define a coarse span of a CG resource and subsequent configurations of the set of hierarchical resource configurations refine the definition of the coarse span to identify the plurality of sets of CG resources, and wherein each configuration of the set of hierarchical resource configurations includes a resource indicator value (RIV) identifying the CG resource;
      identify, by the UE, uplink data for the CG transmissions;
      perform, by the UE, a listen before talk (LBT) procedure at a starting location of a first set of CG resources of the plurality of sets of CG resources, wherein the first set of CG resources includes a plurality of starting locations within a slot of the plurality of slots, wherein performing the LBT procedure includes continuing to perform the LBT procedure at one or more of the plurality of starting locations until the LBT procedure is successful, wherein the first set of CG resources includes a plurality of consecutive uplink data transmission allocations within the slot of the plurality of slots; and
      transmit, by the UE, the uplink data using the first set of CG resources in response to success of the LBT procedure.

22. The apparatus of claim 21, wherein each configuration of the set of hierarchical resource configurations further includes a bitmap identifying the CG resource.

23. The method of claim 1, wherein each set of CG resources of the plurality of CG resources is a slot of the plurality of slots, and each slot of the plurality of slots includes a plurality of starting locations.

24. The method of claim 14, wherein each set of CG resources of the plurality of CG resources is a slot of the plurality of slots, and each slot of the plurality of slots includes a plurality of starting locations.

25. The apparatus of claim 19, wherein each set of CG resources of the plurality of CG resources is a slot of the plurality of slots, and each slot of the plurality of slots includes a plurality of starting locations.

26. The apparatus of claim 21, wherein each set of CG resources of the plurality of CG resources is a slot of the plurality of slots, and each slot of the plurality of slots includes a plurality of starting locations.

* * * * *